US012745152B2

United States Patent
(12) United States Patent
Kakinada et al.

(10) Patent No.: US 12,745,152 B2
(45) Date of Patent: Sep. 22, 2026

(54) METHODS AND APPARATUS FOR OPTIMIZING UE RE-AUTHENTICATION DURING MOBILITY ACROSS DIFFERENT NON-3GPP ACCESS POINTS UNDER A NSWOF

(71) Applicant: Charter Communications Operating, LLC, St. Louis, MO (US)

(72) Inventors: Umamaheswar Achari Kakinada, Greenwood Village, CO (US); Imtiyaz Shaikh, Irving, TX (US); Maulik Vaidya, Escondido, CA (US); Yildirim Sahin, Englewood, CO (US); Paul L. Russell, Jr., Lawrence, NJ (US)

(73) Assignee: Charter Communications Operating, LLC, St. Louis, MO (US)

( * ) Notice: Subject to any disclaimer, the term of this patent is extended or adjusted under 35 U.S.C. 154(b) by 355 days.

(21) Appl. No.: 18/244,156

(22) Filed: Sep. 8, 2023

(65) Prior Publication Data

US 2025/0063449 A1 Feb. 20, 2025

Related U.S. Application Data

(60) Provisional application No. 63/532,674, filed on Aug. 14, 2023.

(51) Int. Cl.
*H04L 29/00* (2006.01)
*H04W 12/06* (2021.01)
(Continued)

(52) U.S. Cl.
CPC .......... *H04W 36/22* (2013.01); *H04W 12/06* (2013.01); *H04W 36/0061* (2013.01);
(Continued)

(58) Field of Classification Search
CPC ................ H04W 36/22; H04W 12/06; H04W 36/0061; H04W 36/08; H04W 36/324; H04W 84/12
See application file for complete search history.

(56) References Cited

U.S. PATENT DOCUMENTS 11,032,710 B2 * 6/2021 Faccin ................. H04W 12/06
11,290,882 B2 * 3/2022 Zaus ...................... H04W 8/12
(Continued)

FOREIGN PATENT DOCUMENTS

WO 2022/146034 A1 7/2022

OTHER PUBLICATIONS

3rd Generation Partnership Project; Technical Specification Group Services and System Aspects; Study on security aspects for support for Wireless and Wireline Convergence Phase 2 (5WWC), (Release 18), 3GPP TR 33.887 V1.0.0, Jun. 2023, 40 pages.
(Continued)

*Primary Examiner* — Don G Zhao
(74) *Attorney, Agent, or Firm* — Straub & Straub; Michael P. Straub; Stephen T. Straub

(57) ABSTRACT

Methods and apparatus for supporting EAP re-authentication for devices, e.g., UEs, connecting to APs such as WiFi APs, which are not 3GPP base stations such as gNBs are described. In accordance with the invention an ER service which supports EAP re-authentication is incorporated into an NSWOF which is coupled to multiple different APs. Once authenticated through the NSWOF via an EAP authorization process the ER service in the NSWOF stores UE re-authorization information and uses the information to re-authenticate a UE when it attaches to another AP to which the NSWOF is coupled. By supporting EAP re-authentication the need to contact an AUSF as part of a full authentication process is avoided and a UE can rapidly move between APs
(Continued)

without having to perform a full EAP authentication involving contacting the AUSF each time the UE moves.

22 Claims, 12 Drawing Sheets

(51) Int. Cl.

| | |
|---|---|
| ***H04W 36/00*** | (2009.01) |
| ***H04W 36/08*** | (2009.01) |
| ***H04W 36/22*** | (2009.01) |
| ***H04W 36/32*** | (2009.01) |
| *H04W 84/12* | (2009.01) |

(52) U.S. Cl.

CPC ......... *H04W 36/08* (2013.01); *H04W 36/324* (2023.05); *H04W 84/12* (2013.01)

(56) References Cited

U.S. PATENT DOCUMENTS

| | | | | |
|---|---|---|---|---|
| 12,170,899 | B2 * | 12/2024 | S Bykampadi | H04L 63/08 |
| 2015/0156686 | A1 * | 6/2015 | Kikuchi | H04W 12/062 455/437 |
| 2015/0208309 | A1 * | 7/2015 | Taneja | H04W 36/0066 455/552.1 |
| 2020/0267554 | A1 * | 8/2020 | Faccin | H04W 12/06 |
| 2020/0344606 | A1 * | 10/2020 | Zaus | H04W 8/18 |
| 2021/0385283 | A1 * | 12/2021 | Talebi Fard | H04W 76/10 |
| 2022/0103540 | A1 * | 3/2022 | Prasad | H04W 12/06 |
| 2022/0408249 | A1 * | 12/2022 | Zamora | H04W 12/06 |
| 2023/0016347 | A1 * | 1/2023 | Nair | H04W 12/72 |
| 2023/0044847 | A1 * | 2/2023 | Palanigounder | H04W 12/06 |
| 2023/0268982 | A1 * | 8/2023 | Li | H04B 7/15507 370/315 |
| 2023/0368077 | A1 * | 11/2023 | Yao | G06N 20/00 |
| 2023/0370879 | A1 * | 11/2023 | Chou | H04W 24/08 |
| 2023/0388871 | A1 * | 11/2023 | Guo | H04W 36/0069 |
| 2024/0073685 | A1 * | 2/2024 | Zhang | H04L 9/0844 |
| 2024/0121663 | A1 * | 4/2024 | Malik | H04L 47/32 |
| 2024/0224028 | A1 * | 7/2024 | Khare | H04W 36/144 |
| 2024/0251239 | A1 * | 7/2024 | Gupta | H04W 12/40 |
| 2024/0298174 | A1 * | 9/2024 | Rajadurai | H04W 12/06 |
| 2024/0397362 | A1 * | 11/2024 | Yao | H04W 24/10 |
| 2024/0414067 | A1 * | 12/2024 | Yao | H04L 41/16 |
| 2025/0097747 | A1 * | 3/2025 | Bhangu | H04B 17/309 |
| 2025/0168635 | A1 * | 5/2025 | Stojanovski | H04W 12/0433 |
| 2025/0184084 | A1 * | 6/2025 | Mondal | H04B 7/0456 |
| 2025/0254639 | A1 * | 8/2025 | Salkintzis | H04W 12/037 |
| 2025/0260976 | A1 * | 8/2025 | Huang | H04W 12/06 |
| 2025/0301318 | A1 * | 9/2025 | Lehtovirta | H04W 12/06 |
| 2025/0301437 | A1 * | 9/2025 | Lehtovirta | H04W 12/0431 |
| 2025/0365286 | A1 * | 11/2025 | Baskaran | H04W 12/088 |
| 2025/0393089 | A1 * | 12/2025 | Li | H04W 76/15 |

OTHER PUBLICATIONS

Notification of Transmittal of the International Search Report and the Written Opinion of the International Searching Authority, International Search Report and Written Opinion of the International Searching Authority from PCT/LJS2024/042133, dated Dec. 18, 2024, 13 pages.

3rd Generation Partnership Project; Technical Specification Group Services and System Aspects; System architecture for the 5G System (5GS); Stage 2 (Release 18), 3GPP TS 23.501 V18.2.2, Jul. 2023, 684 pages.

3rd Generation Partnership Project; Technical Specification Group Services and System Aspects; Security architecture and procedures for 5G system (Release 18), 3GPP TS 33.501 V18.2.0, Jun. 2023, 308 pages.

Aboba et al., Request for Comments (RFC) 3579 entitled "RADIUS (Remote Authentication Dial In User Service) Support for Extensible Authentication Protocol (EAP)", The Internet Society, Sep. 2003, 46 pages.

Aboba et al., Request for Comments (RFC) 3748 entitled "Extensible Authentication Protocol (EAP)", The Internet Society, Jun. 2004, 67 pages.

Salowey et al., Request for Comments (RFC) 5295 entitled "Specification for the Derivation of Root Keys from an Extended Master Session Key (EMSK)", The IETF Trust, Aug. 2008, 21 pages.

Arkko et al., Request for Comments (RFC) 5448 entitled "Improved Extensible Authentication Protocol Method for 3rd Generation Authentication and Key Agreement (EAP-AKA')", IETF Trust, May 2009, 29 pages.

Cao et al., Request for Comments (RFC) 6696 entitled "EAP Extensions for the EAP Re-authentication Protocol (ERP)", Internet Engineering Task Force, Jul. 2012, 47 pages.

3rd Generation Partnership Project; Technical Specification Group Services and System Aspects; Procedures for the 5G System (5GS); Stage 2 (Release 18), 3GPP TS 23.502 V18.2.0, Jun. 2023, 895 pages.

* cited by examiner 100
101
UE
102
UEn
103
121
UE
102'
114
122
WLAN-AP1
104
WLAN-AP2
106
SWa'
116
SWa'
124
NSWOF
108
N60
118
AUSF
110
N13
120
UDM
112
151
152
154
Nausf
156
Nudm

METHODS AND APPARATUS FOR OPTIMIZING UE RE-AUTHENTICATION DURING MOBILITY ACROSS DIFFERENT NON-3GPP ACCESS POINTS UNDER A NSWOF

RELATED APPLICATIONS

The present application claims the benefit of U.S. Provisional Patent application Ser. No. 63/532,674 which was filed on Aug. 14, 2023 and which is hereby expressly incorporated by reference in its entirety.

FIELD

The present application relates to communications methods and apparatus, and more particularly, to methods and apparatus for optimizing user equipment (UE) re-authentication during mobility across different non-3GPP Access Points (APs), e.g., WiFi APs, under a Non-Seamless Wireless Local Area Network (WLAN) Offload Function (NSWOF).

BACKGROUND

As per the current 3GPP specifications, there is no optimization available UE mobility in non-3GPP access. As a result, when a device, e.g., UE, moves from one AP to another for Non-Seamless Wireless LAN Offload (NSWO), a full authentication of the device is performed, even though the UE may have moved a relatively short physical distance from the coverage area of one AP, e.g., WiFi AP, to the coverage area of an adjacent AP, e.g., another WiFi AP. In some cases the APs may even be in the same building.

The full authentication of a device, performed with each move from one AP to another, becomes disruptive because of the frequency and/or time required to implemented full authentication. This is particularly the case given the small coverage areas of many APs which provide non-3GPP access. The requirement for full authentication during mobility as a UE moves between AP coverage areas can cause communications delays, since such changes between APs can be frequent and full authentication can be relatively time consuming with the time involved in authentication being time periods in which the UE normally can not send data for UE applications through an AP. While authentication is a necessary process it is a time-consuming process that disrupts user plane traffic and user experience. It is desirable to reduce of minimize such disruptions to user plane traffic and thereby provide a user a satisfactory experience even when the UE switches between APs frequently.

In view of the above it should be appreciated that there is a need for optimization for device re-authentication during mobility from one AP to another AP to reduce or limit the amount of time traffic communication is disrupted. It would be desirable if at least some improvements relating to re-authentication could be made which could be incorporated into a Non-Seamless Wireless LAN Offload Function (NSWOF) so that UE movement between APs does not require full authentication for each move between APs.

SUMMARY

Methods and apparatus for supporting re-authentication of UEs as they move from one AP, e.g., one WiFi AP, to another AP, e.g., another WiFi AP, without requiring full authentication of a UE with each move are described. In various embodiments a system includes an NSWOF which includes an EAP Re-authentication (ER) server thereby allowing with the NSWOF to support ER functionality. The NSWOF including the ER server is used to provide service to multiple Access Points (APs), e.g., WiFi APs. The APs in turn provide UEs with non-3GPP access to a communications network. The exemplary system also includes, in some embodiments, an AUSF which includes an EAP authentication server and which provides authentication services to the NSWOF which can be used in authenticating UEs accessing the network via APs, e.g., WiFi APs.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
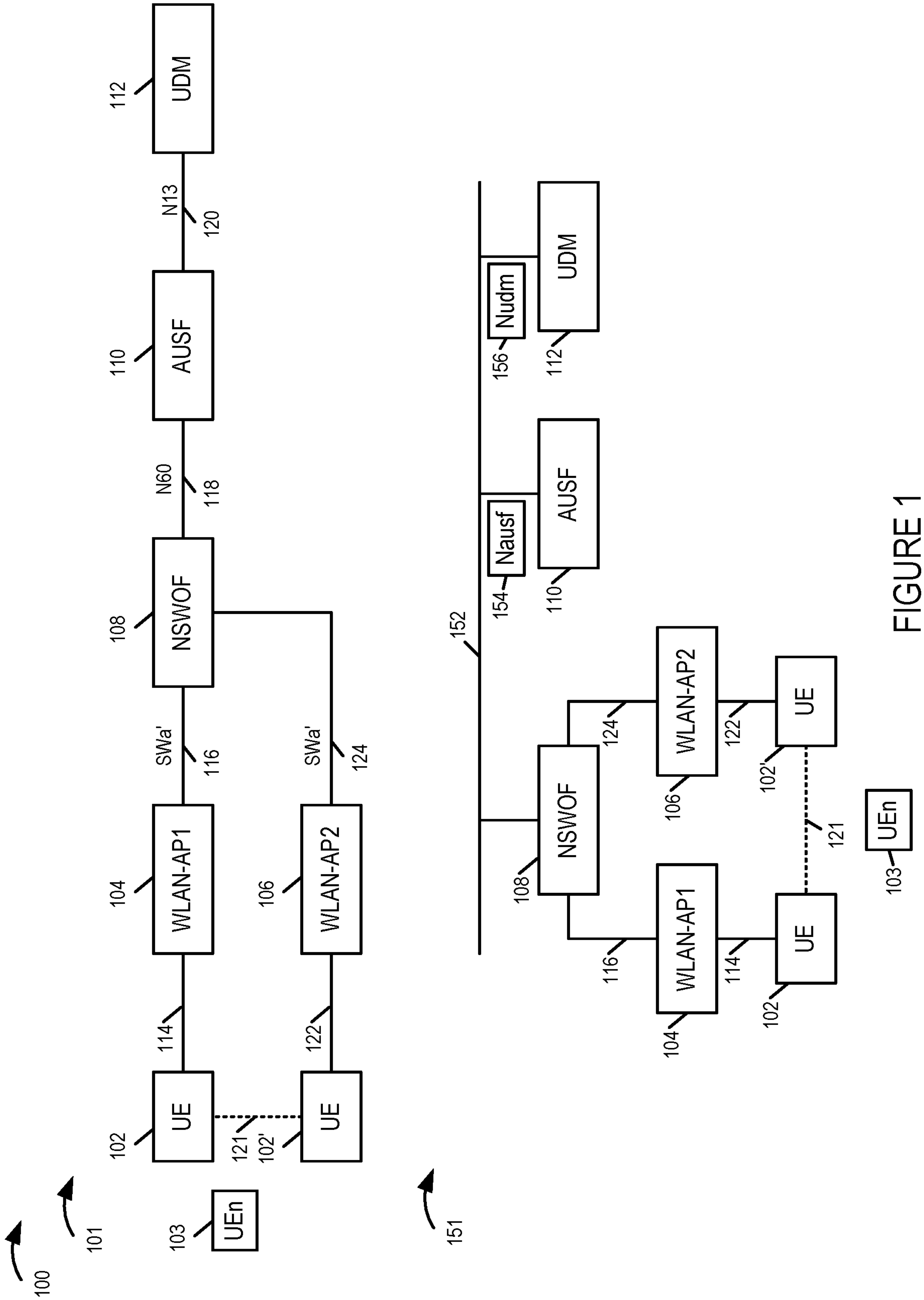
FIG. 1 is a drawing of an example system in which the methods of the invention are used.

FIG. 1 is a drawing of an example system 100 in which the methods of the invention are used. The exemplary system includes a plurality of user equipments (UE) including exemplary user equipment (UE) 102 and exemplary UEn 103, a plurality of alternative wireless local area network (WLAN) access points (APs) including WLAN-AP1 104 and WLAN-AP2 106, and a core network, e.g., a 5G core network, including a Non-Seamless WLAN Offload Function (NSWOF) 108, an Authentication Server Function (AUSF) 110 and a Unified Data Management (UDM) 112 coupled together.

Top drawing 101 of FIG. 1 illustrates exemplary UE 102, moving from WLAN-AP1 104 to WLAN-AP2 106, as indicated by dotted line 121. UE 102 is represented as UE 102' when attached to WLAN-AP2 106. Drawing 101 further illustrates: wireless connection 114 between UE 102 and WLAN-AP1 104, wireless connection 122 between UE 102' and WLAN-A2 106, SWa' interface 116 between WLAN-AP1 104 and NSWOF 108, SWA' interface 124 between WLAN-AP2 106 and NSWOF 108, N60 interface 118 between NSWOF 108 and AUSF 110, and N13 interface 120 between AUSF 110 and UDM 112.

Bottom drawing 151 of FIG. 1, further illustrates: that the NSWOF 108, AUSF 110 and UDM 112 of the core are coupled together via connection 152, that Nausf type messages 154 are communicated between the NSWOF 108 and the AUSF 110, and that Nudm type messages 156 are communicated between the AUSF 110 and the UDM 112.

Figure 2:
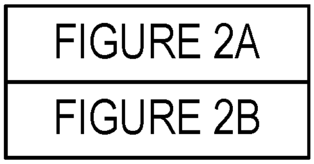
FIG. 2 comprises the combination of FIG. 2A and FIG. 2B.
Figure 2A:
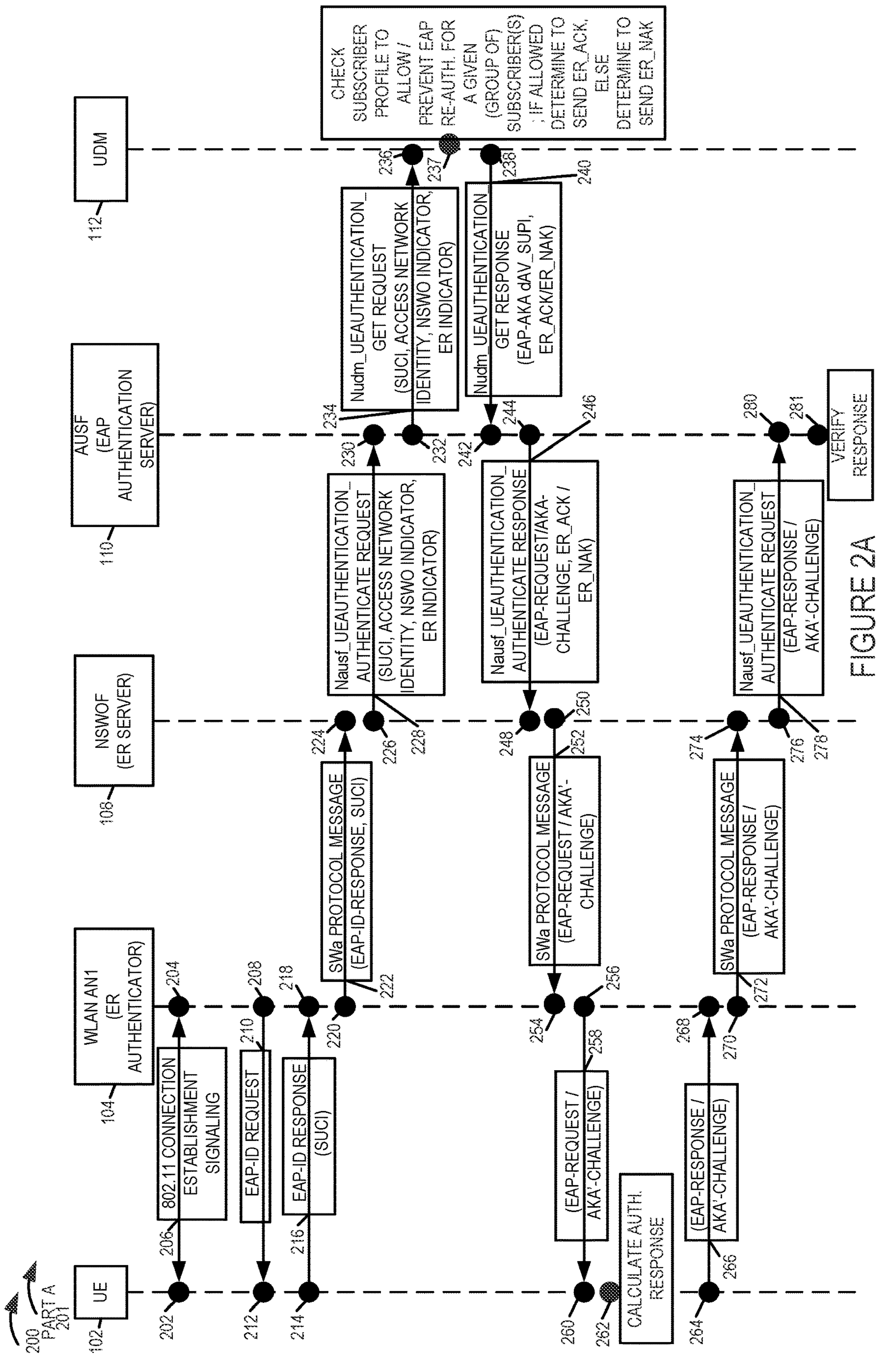
FIG. 2A is a first part of an exemplary signaling diagram illustrating a new user equipment (UE) authentication procedure implemented in accordance with some embodiments, e.g., for a first time.
Figure 2B:
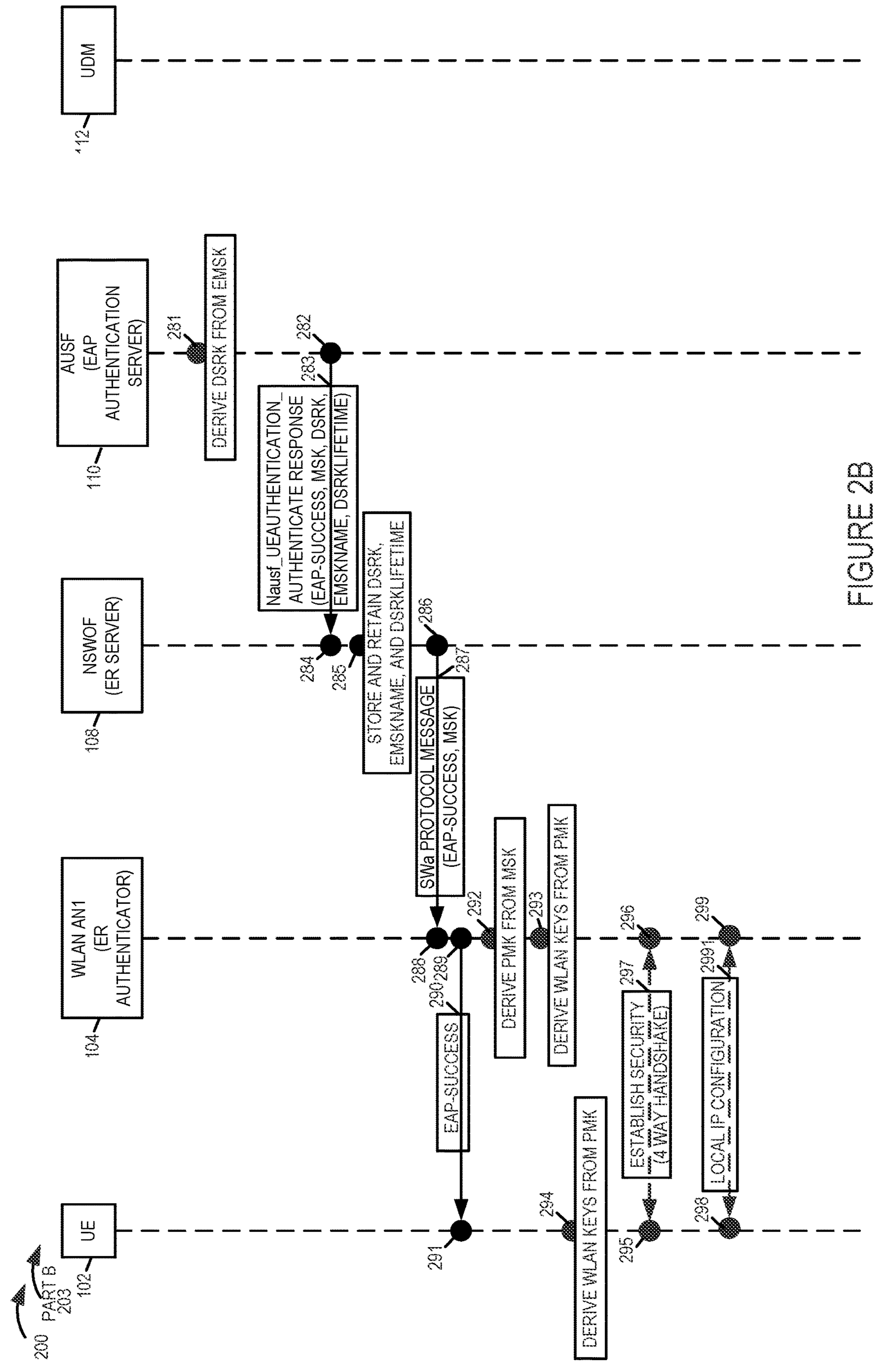
FIG. 2B is a second part of an exemplary signaling diagram illustrating a new UE authentication procedure implemented in accordance with some embodiments, e.g., for a first time.

FIG. 2, comprising the combination of FIG. 2A and FIG. 2B, shows a new UE authentication procedure implemented in accordance with some embodiments when a UE accesses the network shown in FIG. 1 via a WLAN AP which may be a first WiFi AP (such as WLAN access node 1 (AN1), which is WLAN AP1 104), e.g., for a first time. FIG. 2 includes drawing 200 which comprises the combination of Part A 201 of FIG. 2A and Part B 203 of FIG. 2B.

Drawing 200 of FIG. 2 includes elements: UE 102, WLAN-AN1 104 (which includes Extensible Authentication Protocol (EAP) Re-authentication (ER) authenticator functionality), NSWOF 108 (which includes ER server functionality), AUSF 110 (which includes EAP authentication server functionality) and UDM 112, of system 100 of FIG. 1, and further illustrates exemplary operations performed, and exemplary messaging in accordance with an exemplary embodiment.

In steps 202 and 204, UE 102 and WLAN-AN1 104 are, respectively, operated to exchange 802.11 connection establishment signaling 206. In step 208 WLAN-AP1 104 generates and sends EAP-ID request 210 to UE 102. In step 212 UE 102 receives the EAP-ID request 210. In step 214, UE 102 generates and sends EAP-ID response 216 including a Subscriber Concealed Identifier (SUCI) to WLAN-AP1 104. In step 218 the WLAN-AP1 104 receives the EAP-ID response 216 and recovers the communicated information.

In step 220 the WLAN-AN1 104 generates and sends SWa protocol message 222 to the NSWOF 108. The SWa protocol message 222 includes the EAP-ID response and SUCI from message 216. In step 224 the NSWOF 108 receives the SWa protocol message 222 and recovers the communicated information.

In step 226, the NSWOF 108 generates and sends a Nausf_UEAuthentication_Authenticate Request message 228 to AUSF 110. The Nausf_UEAuthentication_Authenticate Request message 228 includes SUCI, Access Network Identity, NSWO Indicator, and ER indicator. In step 230 the AUSF 110 receives the Nausf_UEAuthentication_Authenticate Request message 228 and recovers the communicated information. In step 232 the AUSF 110 generates and sends a Nudm_UEAuthenticaiton_Get Request message 234 to UDM 112. The Nudm_UEAuthenticaiton_Get Request message 234 includes SUCI, Access Network Identity, NSWO indicator, and ER indicator. In step 236 the UDM receives the Nudm_UEAuthenticaiton_Get Request message 234 and recovers the communicated information. In step 237 the UDM checks the subscriber profile (e.g., corresponding to the received SUCI) to allow/prevent Re-authentication for a given (group of) subscriber(s). If the determination is that Re-authentication is allowed for the subscriber being checked, then the UDM 112 determines to send an ER_Ack, else the UDM determines to send ER_Nak. This approach would be fully backward compatible with prior UEs. In some embodiments in step 237 the UDM (112) determines if ER services are to be provided to the first UE (102) based on one, more than one, all or any combination of: i) a service subscription associated with the first UE, iii) a UE identifier: iii) operator policy: iv) a profile associated with the first UE, v) a domain associated with first UE, vi) network usage information associated with the first UE, vii) a security status associated with the first UE.

In step 238, the UDM 112 generates and sends a Nudm_UEAuthentication_Get Response message 240 to the AUSF 110. The Nudm_UEAuthentication_Get Response message 240 includes Extensible Authentication Protocol (EAP)-Authentication and Key Agreement (AKA) dAV_Subscription Permanent Identifier (SUPI), and an ER_Ack (Acknowledgemnt) or an ER_Nak (Negative Acknowledgment), depending upon the determination of step 237. In step 242 the AUSF 110 receives Nudm_UEAuthentication_Get Response message 240 and recovers the communicated information.

In some embodiments, steps 232, 236, 237, 238 and 242 are optional, and are included in some embodiments and omitted, e.g., bypassed, in other embodiments. Thus, in some embodiments, optionally, AUSF 110 forwards (step 232) ER indicator to the UDM 112 (as part of message 234), UDM 112 checks (in step 237) subscriber profile to allow/prevent EAP-Re-authentication for a given (group of) subscriber(s). If allowed the UDM 112 sends (in step 238) ER_Ack (as part of message 240): else the UDM 112 sends (in step 238) ER_Nak (as part of message 240). This approach would be fully backward compatible with prior UEs.

In step 244 the AUSF 110 generates and sends Nausf_UEAuthentication_Authenticate Response message 246 to NSWOF 108. The Nausf_UEAuthentication_Authenticate Response message 246 includes EAP-Request/AKA challenge and ER_ack/ER_nak. In step 248 the NSWOF 108 receives the Nausf_UEAuthentication_Authenticate Response message 246 and recovers the communicated information. In step 250, the NSWOF 108 generates and sends SWa protocol message 252 to WLAN AN1 104. The SWa protocol message 252 includes EAP-Request/AKA'-challenge. In step 254, the WLAN AN1 104 receives the SWa protocol message 252 and recovers the communicated information. In step 256 the WLAN AN 1 104 generates and sends signals 258 communicating the EAP-Request/AKA' challenge information 258 to UE 102, which receives signals 258 and recovers the communicated information in step 260.

In step 260 the UE 102 calculates an authentication response. In step 264 the UE 102 generates and sends signals 266 to WLAN AN1 104, said signals 266 communicating the EAP-Response/AKA'-challenge. In step 268 WLAN AN1 104 receives signals 266 and recovers the communicated information. In step 270 the WLAN AN1 104 generates and sends SWa protocol message 272 to NSWOF 108.

The SWa protocol message 272 includes the EAP-Response/AKA'-challenge. In step 274, the NSWOF 108 receives the SWa protocol message 274 and recovers the communicated information. In step 276 the NSWOF 108 generates and sends Nausf UEAuthentication_Authenticate request message 278 to AUSSF 110. The Nausf UEAuthentication_Authenticate request message 278 includes the EAP-Response/AKA-challenge. In step 280 the AUSF receives the Nausf UEAuthentication_Authenticate request message 278 and recovers the communicated information. In step 281 the AUSF 110 verifies the response.

In step 281 the AUSF derives a Domain Specific Root Key (DSRK) from an Extended Master Session Key (EMSK) (e.g., in some embodiments, the DSRK is derived from EMSK as per specs in RFC 5295 sections 2 & 3). In step 282 the AUSF 110 generates and sends Nausf_UEAuthetincation_Authenticate response message 283 to NSWOF 108. The Nausf_UEAuthetincation_Authenticate response message 283 includes EAP-Success, Master Session Key (MSK), DSRK, Extended Master Session Key Name (EMSKName), and DSRK lifetime. Thus, in some embodiments, the AUSF 110, in step 282 shall additionally send DSRK, EMSKname and DSRKLifetime to NSWOF 108 in a process which is the same or similar to that specified in RFC 6696 sec 5.1.

In step 284 the NSWOF 108 receives the Nausf_UEAuthetincation_Authenticate response message 283 and recovers the communicated information. In step 285 the NSWOF 108 stores and retains the DSRK, EMSKname and the DSRKLifetime, e.g. within its memory. In step 286 the NSWOF generates and sends SWa protocol message 287, which includes EAP-Success indication and the MSK, to WLAN AN1 104. In some embodiments, the NSWOF 108 stores and retains (e.g., step 285) the DSRK and EMSKname, DSRKLifetime with itself and forwards (e.g., step 286) MSK and EAP-Success indicator to the AN (e.g., WLAN AN 1 104) in a process which is the same or similar to the process specified in RFC 6696 sec 5.1.

In step 288 the WLAN AN1 104 receives the SWa protocol message 287 and recovers the communicated information. In step 289 the WLAN AN 1 104 generates and sends signals 290 communicating the EAP-success indication to the UE 102. In step 291, UE 102 receives signals 290 and recovers the EAP-success indication.

In step 292 the WLAN AN1 104 derives pairwise master key (PMK) from the received MSK. In step 293 the WLAN AN1 104 derives WLAN keys from the PMK.

In step 294 UE 102 derives WLAN keys from the PMK, which is known to the UE 104.

In steps 295 and 296, the UE 102 and the WLAN-AN1 104, respectively, communicate security establishment signaling 297 including a 4 way handshake. In steps 298 and 299 the UE 102 and the WLAN-AN1 104 communicate local IP configuration information 2991.

Figure 3:
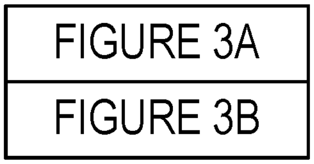
FIG. 3 comprises the combination of FIG. 3A and FIG. 3B.
Figure 3A:
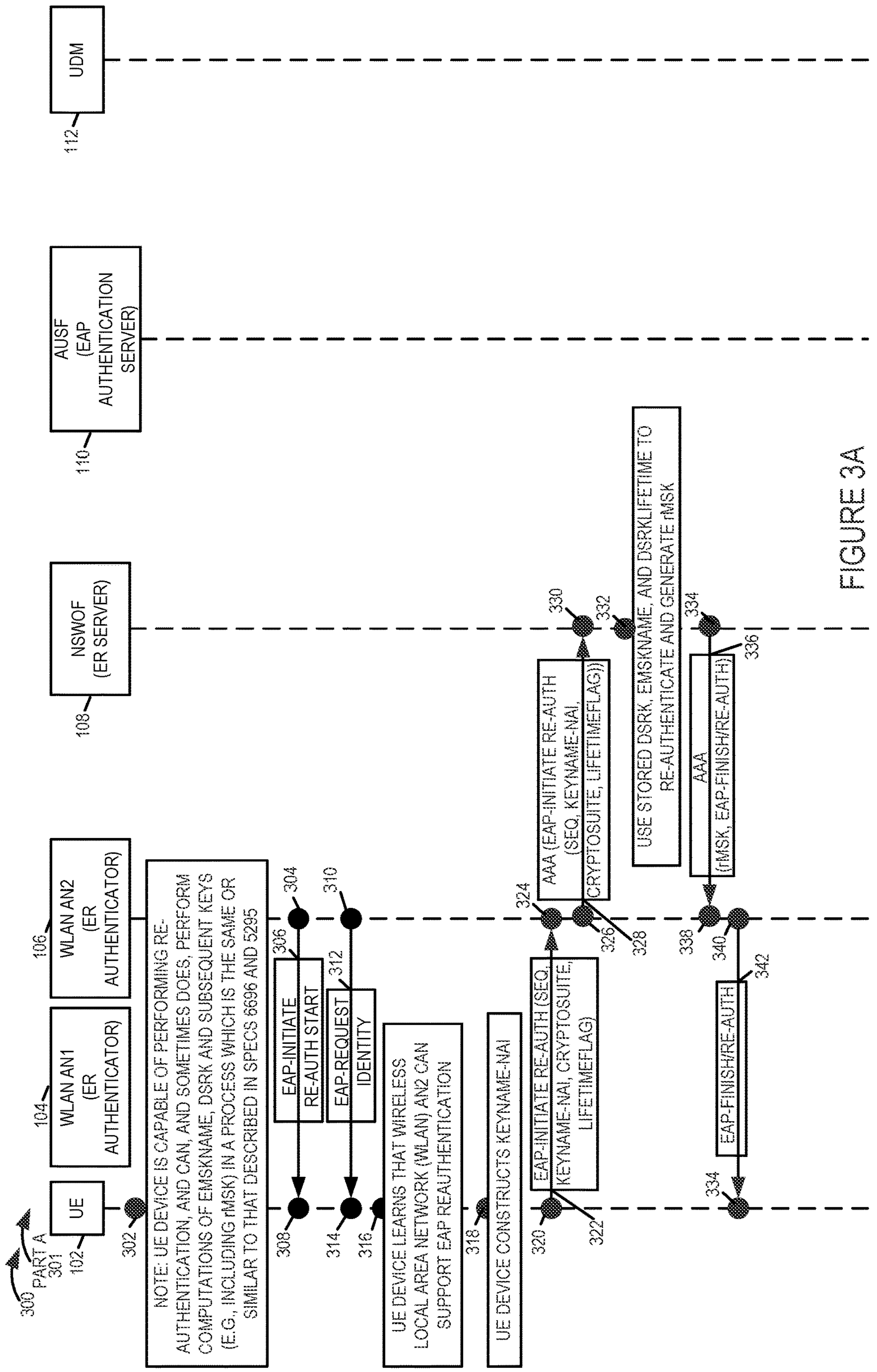
FIG. 3A is a first part of a signaling diagram illustrating a new UE re-authentication procedure implemented in accordance with some embodiments which is used when a UE which has already authenticated via the NSWOF, which includes an EAP Re-authentication (ER) server, moves to another AP.
Figure 3B:
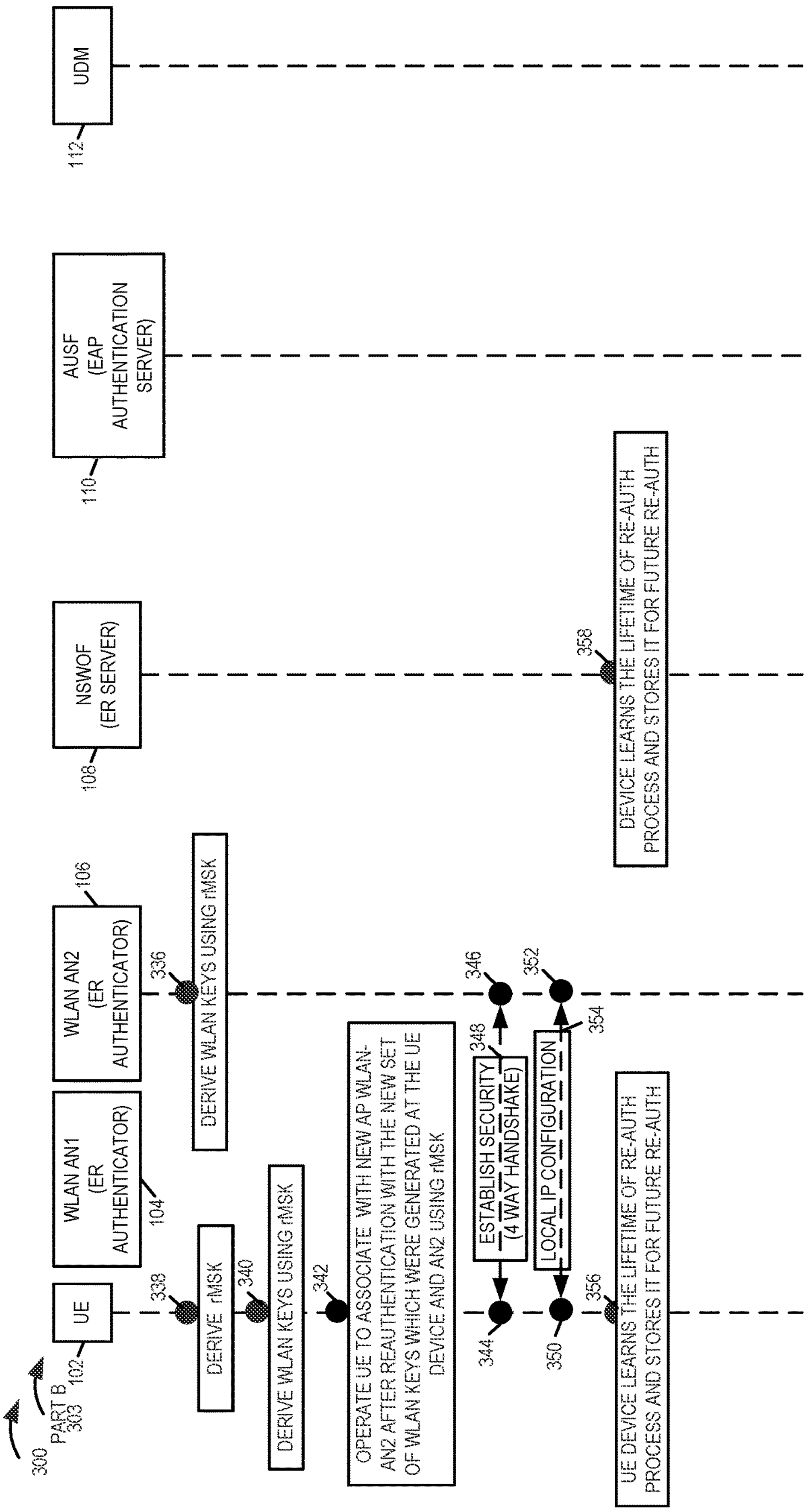
FIG. 3B is a second part of a signaling diagram illustrating a new UE re-authentication procedure implemented in accordance with some embodiments which is used when a UE which has already authenticated via the NSWOF, which includes an EAP Re-authentication (ER), server moves to another AP.

FIG. 3 shows a new UE re-authentication procedure implemented in accordance with some embodiments which is used when a UE which has already authenticated via the NSWOF moves to another AP, e.g., a second WLN AN (e.g., WLAN AN2 which may be a second WiFi AP 106). FIG. 3 includes drawing 300 which comprises the combination of Part A 301 of FIG. 3A and Part B 303 of FIG. 3B.

Drawing 300 of FIG. 3 includes elements: UE 102, WLAN-AN1 104 (which includes ER authenticator functionality), WLAN-AN2 106 (which includes ER authenticator functionality), NSWOF 108 (which includes ER server functionality), AUSF 110 (which includes EAP authentication server functionality) and UDM 112, of system 100 of FIG. 1, and further illustrates exemplary operations performed, and exemplary messaging in accordance with an exemplary embodiment.

For the example of FIG. 3, consider that the operations of FIG. 2 have been previously performed and that UE 102 has had previously been successfully authenticated via the NSWOF 108, as part of process performed when the UE 104 was obtaining wireless access via WLAN AN 1 104, and that UE 102 has subsequently moved to WLAN AN2 106.

Note 302 indicates that UE device 102 is capable of performing re-authentication, and can, and sometimes does, preform computations of EMSKName, DSRK and subsequent keys (e.g., including re-authentication root key (rRK), re-authentication Integrity Key (rIK) and re-authentication MSK (rMSR)) in a process which is the same or similar to that described in specs 6696 and 5295.

In step 304 WLAN AN2 106 generates and sends an EAP-Initiate Re-Authentication Start message 306 to UE 102. In step 308 UE 102 receives the EAP-Initiate Re-Authentication Start message 306.

In step 310 WLAN AN2 106 generates and sends an EAP-Request Identity message 312 to UE 102. In step 314 UE 102 receives the EAP-Request Identity message 312.

In step 316 UE 102 learns that wireless local area network (WLAN) AN2 106 can support EAP Re-Authentication, e.g., based on received message 306.

In step 316, UE 102, which has been previously authenticated (see FIG. 2) and which is capable of performing Re-authentication, constructs Keyname-NAI.

In step 320 UE 102 generates and sends EAP-Initiate RE-Authentication message 322 including SEQ, Keyname-NAI, CryptoSuite, and Lifetimeflag. In step 324, WLAN AN2 106 receives the EAP-Initiate RE-Auth message 322 and recovers the communicated information. In step 326, WLAN-AN2 106 generates and sends authentication authorization and accounting (AAA) message 328 including the received EAP-Initiate RE-Auth message 322 including SEQ, Keyname-NAI, CryptoSuite, and Lifetimeflag to the NSWOF 108. In step 330, the NSWOF 108 receives the AAA message 328 and recovers the communicated information. In step 332 the NSWOF 108 uses the stored DSRK, EMSKName and DSRKLifetime to re-authenticate UE 102 and generate a rMSK. In step 334, NSWOF 108 generates and sends AAA message 336 including the rMSK and a EAP-Finish/Re-Auth indication to WLAN AN2 106. In step 338 WLAN AN2 106 receives AAA message 336 and recovers the communicated information. In step 340 WLAN AN2 106 generates and sends EAP-Finish/Re-Auth message 342 to UE 102, which receives message 342 and recovers the communicated information.

In some embodiments, messages 322, 328, 336 and 342 are compliant with RFC 6696 (Sec. 5.1, sec 5.2, Sec 5.3.2 and sec 5.3.3).

In step 336 WLAN-AN2 106 derives WLAN keys using the received rMSK. In step 338 UE 338 derives the rMSK. In step 340 UE 102 derives the WLAN keys using the rMSK.

In step 342 UE2 102 is operated to get associated with the new AP WLAN-AN2 106 after re-authentication with the new set of WLAN keys, which were generated at the UE device 102 and at WLAN-AN2 106 using rMSK.

In steps 344 and 346, the UE 102 and the WLAN-AN2 106, are operated, respectively, to communicate security establishment signals 448 including 4 way handshake signals. In steps 350 and 354, the UE 102 and the WLAN AN2 106, are operated, respectively, to communicate local IP configuration information 354.

In step 356 UE 102 learns the lifetime of the re-authentication process and stores it for future re-authentications. In step 358 NSWOF 108 learns the lifetime of the re-authentication process and stores it for future re-authentications. For subsequent re-authentications, the UE device 102 and NSWOF 108 derive and use keys in a manner which is the same or similar to the process described in section 3 of RFC 5295.

Some benefits of the UE RE-authentication Procedure for NSWOF, in accordance with the present approach, will now be described. This new approach minimizes or reduces steps to be followed during device (e.g., UE) re-authentication. This new approach minimizes or reduces disruption to data exchange between device (e.g., UE) and network. The enhancements, in accordance with the present invention, are fully backward compatible. This new approach minimizes load on 5G core functions (e.g., AUSF, UDM). This new procedure can be, and sometimes is, selectively enabled or selectively disabled for a given device or set of devices (e.g., set of UE(s)) based on device profile and/or security status. For example, some UEs, requiring a high level of security, may not be enabled to implement this UE re-authentication procedure for NSWO, e.g., requiring the UE (with the high level of security) to go thorough a full authentication process including interaction with the AUSF (as in FIG. 2) each time the UE connects with a different WLAN-AN. Operator policies can, and sometimes do, influence and/or control this feature in a fine-grained manner.

Figure 4:
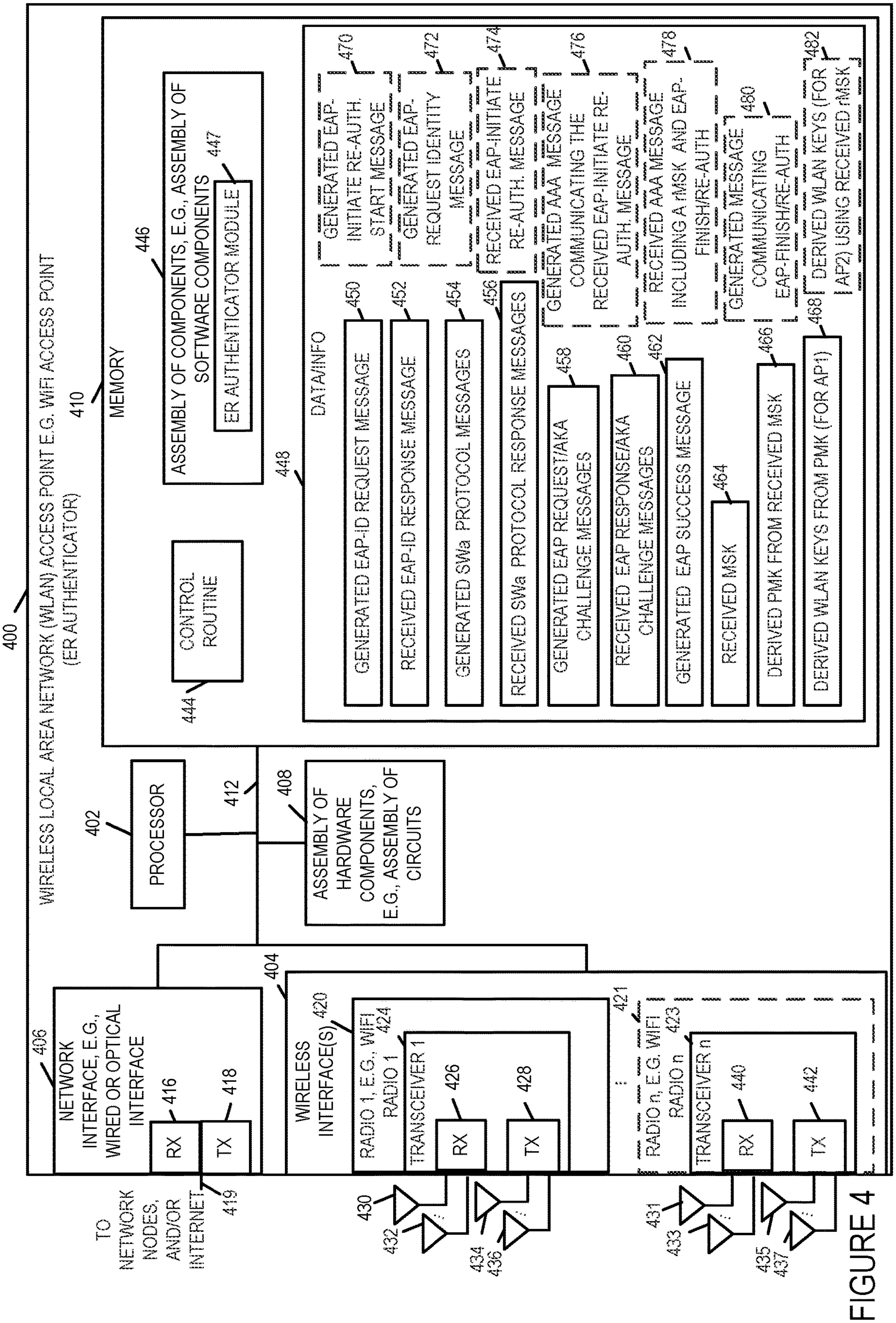
FIG. 4 is a drawing of an exemplary wireless local area network (WLAN) access point (AP), e.g., a WIFI AP, which includes ER authenticator functionality in accordance with an exemplary embodiment.

FIG. 4 is a drawing of an exemplary Wireless Local Area Network (WLAN) access point 400, e.g., a WiFi access point (AP), in accordance with an exemplary embodiment. WLAN AP 400 is, e.g., WLAN AN2 104 or WLAN AN2 106 of FIGS. 1-3. WLAN AP 400 includes a processor 402, e.g., a CPU, a network interface 406, wireless interface(s) 404, an assembly of hardware components 408, e.g., an assembly of circuits, and memory 410 coupled together via a bus 412 over which the various elements may interchange data and information.

Network interface 406, e.g., a wired or optical interface, includes a receiver (RX) 416, a transmitter (TX) 418, and connector 419. WLAN AP 400 receives signals from network nodes and/or the Internet via connector 419 and receiver 416. WLAN AP 400 sends signals to other network nodes via transmitter 418, connector 419 and/or the Internet.

Wireless interface(s) 404 includes one or more wireless interfaces (radio 1 420, e.g., WiFi radio 1, . . . , radio n 421, e.g., WiFi radio n). In some embodiments, the different radio wireless interfaces correspond to different frequency bands, e.g., different WiFi frequency bands, and/or different communications protocols, e.g., different WiFi communications protocols. Radio 1 420 includes wireless receiver 426 coupled to one or more receive antennas or receive antenna elements (430, . . . , 432) via which the WLAN AP 400 receives wireless signals, e.g., from UEs. Radio 1 420 further includes wireless transmitter 428 coupled to one or more transmit antennas or transmit antennal elements (434, . . . , 436) via which the WLAN AP 400 transmits wireless signals, e.g., to UEs. In some embodiment radio 1 420 is implemented as transceiver 1 424, e.g., a transceiver chip.

Radio n 421 includes wireless receiver 440 coupled to one or more receive antennas or receive antenna elements (431, . . . , 433) via which the WLAN AP 400 receives wireless signals, e.g., from UEs. Radio n 421 further includes wireless transmitter 442 coupled to one or more transmit antennas or transmit antennal elements (435, 437) via which the WLAN AP 400 transmits wireless signals, e.g., to UEs. In some embodiment radio N 423 is implemented as transceiver n 423, e.g., a transceiver chip.

Memory 410 includes control routine 444, assembly of components 446, e.g., an assembly of software components, and data/information 448. Control routine 444 includes instructions, which when executed by processor 402 control the WLAN AP 400 to perform basic device operational functions such as, e.g., controlling the network interface 406, controlling wireless interfaces 404, accessing memory 410, storing in memory 410, etc. Assembly of components 446, e.g., an assembly of software components, includes instructions, which when executed by processor 402 control the WLAN AP 400 to implement steps of a method, e.g., steps of the methods of signaling diagrams 200 of FIG. 2 and 300 of FIG. 3, which are performed by a WLAN AP. Assembly of components 446 includes ER authenticator module 447.

In some embodiments, WLAN AP 400, e.g., a WiFi AP, which includes an ER authenticator, acts as a first AP with regard to a UE, and the UE performs an initial authentication via the first AP, and data/information 448 includes data/information elements 450, 452, 454, 456, 458, 460, 462, 464, 466, and 468. In some embodiments, WLAN AP 400, e.g., a WiFi AP, which includes and ER authenticator, acts as a second AP with regard to a UE, and the UE performs a re-authentication via the second AP, and data/information 448 includes data/information elements 470, 472, 474, 476, 478, 480, and 482. Data/information 448, in some embodiments, includes generated EAP-ID request message 450, received EAP-ID response message 452, generated SWa protocol messages 456, generated EAP request/AKA challenge messages 458, received EAP response/AKA challenge messages 460, a generated EAP success message 462, a received MSK 464, a derived PMK 466, which was derived from the received MSK, derived WLAN keys 468 (for AP1), which were derived from the PMK. Data/information 448, in some embodiments, includes a generated EAP-Initiate Re-Authentication start message 470 to be sent to a UE, a generated EAP-Request Identity message 472 to be sent to a UE, a received EAP-Initiate Re-Authentication message 474 from a UE, a generated AAA message 476 communicating the received EAP-Initiate Re-Authentication message to be sent to a NSWOF, a received AAA message 478 from the NSWOF communicating a rMSK and EAP-Finish/Re-Authentication indication, a generated EAP-Finish/Re-Authentication message 480 to be sent to a UE, and derived WLAN keys 482 (for use with AP2) which were derived using the received rMSK.

Figure 5:
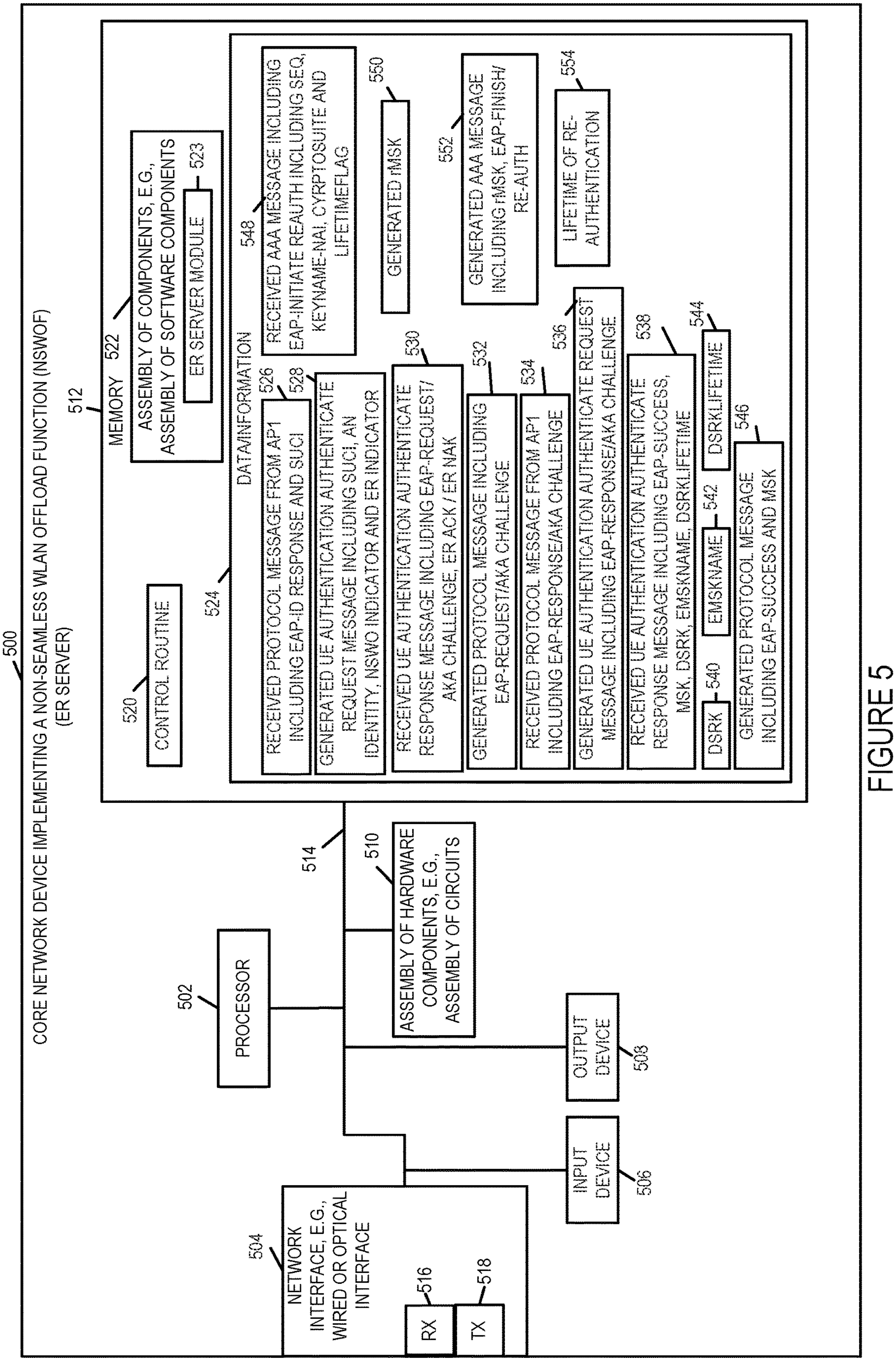
FIG. 5 is a drawing of an exemplary core network device implementing a Non-Seamlesss WLAN Offload Function (NSWOF) which includes ER server functionality in accordance with an exemplary embodiment.

FIG. 5 is a drawing of an exemplary core network device 500 implementing a Non-Seamlesss WLAN Offload Function (NSWOF) which includes ER server functionality in accordance with an exemplary embodiment. Core network device 500 implementing a Non-Seamlesss WLAN Offload Function (NSWOF) which includes ER server functionality is, e.g., NSWOF 108 of FIGS. 1-3.

Core network device 500 includes a processor 502, e.g., a CPU, a network interface 504, an input device 506, e.g., a keyboard or mouse, an output device 508, e.g., a display, an assembly of hardware components 510, e.g., an assembly of circuits, and memory 512 coupled together via a bus 514 over which the various elements may interchange data and information.

Network interface 504, e.g., a wired or optical interface, includes a receiver 516 and a transmitter 518, via which the network device 500 implementing a NSWOF may communicate with other devices. Network device 500 implementing a NSWOF receives signals including messages from other devices, e.g., WLAN APs, and core network nodes devices, e.g., an AUSF device, via receiver 516. Network device 500 implementing a NSWOF sends signals including messages to other devices, e.g., WLAN APs, and core network nodes devices, e.g., an AUSF device, via transmitter 518.

Memory 512 includes a control routine 520, an assembly of components 522, e.g., an assembly of software components, and data/information 524. Control routine 520 includes instructions, which when executed by processor 502 controls the core network device 500 implementing the NSWOF to perform basic device operational functions such as, e.g., controlling the network interface 504, accessing memory 512, storing in memory 510, etc. Assembly of components 522, e.g., an assembly of software components, includes instructions, which when executed by processor 502 control the core network device 500 implementing the NSWOF to implement steps of a method, e.g., steps of the methods of signaling diagrams 200 of FIG. 2 and 300 of FIG. 3, which are performed by a NSWOF. Assembly of components 522 includes ER server module 523.

Data/information 524 includes a received protocol message 526 from a first AP, e.g., AP1, including an EAP-ID response and a SUCI, a generated UE authentication authenticate request message 528, to be sent to an AUSF, including the SUCI, an access network (AN) identity, a NSWO indicator, and an ER indicator, a received UE authentication authenticate response message 530, from an AUSF, including EAP-Request/AKA challenge, and ER ack/ER nak indication, and a generated protocol message 532, to be sent to AP1, including EAP-request/AKA challenge. Data/information 524 further includes a received protocol message 534 from AP1 including an EAP-response/AKA challenge, and a generated UE authentication authenticate request message 536, to be sent to AUSF, including the EAP-response/AKA challenge, a received UE authentication authenticate response message 538, from the AUSF, including an EAP-success indication, MSK, DSRK, EMSKname and DSRKLifetime. Data/information 524 further includes the DSRK 540, the EMSKname 542, and the DSRKLifetime 544, which have been stored to be available to be used in a future re-authentications of the UE. Data/information 524 further includes a generated protocol message 546 to be sent to AP1 including the EAP-Success indication and the received MSK.

Data/information 524 further includes a received AAA message 548 from a second access point, e.g., AP2, including an EAP-Initiate Re-authentication message including SEQ, Keyname-NAI, CryptoSuite and Lifetimeflag, a generated rMSK 550, a generated AAA message 552, to be sent to AP2, including rMSK and an EAP-Finish/Re-Auth indication, and a lifetime 554 of the re-authentication.

Figure 6:
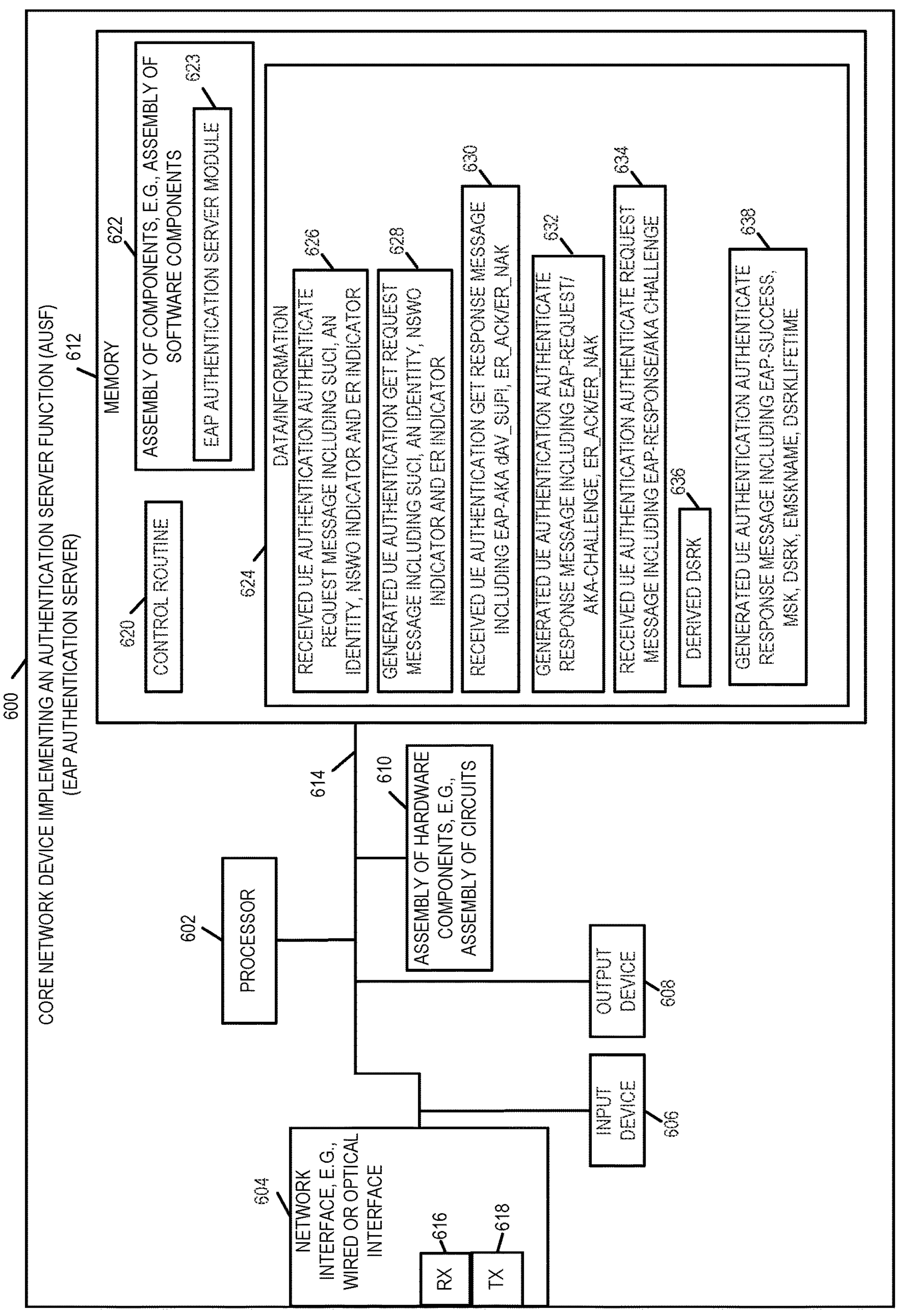
FIG. 6 is a drawing of an exemplary core network device implementing an authentication server function (AUSF), which includes EAP authentication server functionality, in accordance with an exemplary embodiment.

FIG. 6 is a drawing of an exemplary core network device 600 implementing an authentication server function (AUSF) which includes EAP authentication server functionality in accordance with an exemplary embodiment. Core network device 600 implements an authentication server function (AUSF) which includes EAP authentication server functionality is, e.g., AUSF 110 of FIGS. 1-3.

Core network device 600 includes a processor 602, e.g., a CPU, a network interface 604, an input device 606, e.g., a keyboard or mouse, an output device 608, e.g., a display, an assembly of hardware components 610, e.g., an assembly of circuits, and memory 612 coupled together via a bus 614 over which the various elements may interchange data and information.

Network interface 604, e.g., a wired or optical interface, includes a receiver 616 and a transmitter 618, via which the network device 600 implementing an AUSF may communicate with other devices. Network device 600 implementing an AUSF receives signals including messages from other devices, e.g., core network nodes devices, e.g., an NSWOF device, a UDM device, via receiver 616. Network device 600 implementing an AUSF sends signals including messages to other devices, e.g., core network nodes devices, e.g., a NSWOF device and a UDM device, via transmitter 618.

Memory 612 includes a control routine 620, an assembly of components 622, e.g., an assembly of software components, and data/information 624. Control routine 620 includes instructions, which when executed by processor 602 controls the core network device 600 implementing the AUSF to perform basic device operational functions such as, e.g., controlling the network interface 604, accessing memory 612, storing in memory 612, etc. Assembly of components 622, e.g., an assembly of software components, includes instructions, which when executed by processor 602 control the core network device 600 implementing the AUSF to implement steps of a method, e.g., steps of the methods of signaling diagrams 200 of FIG. 2 and 300 of FIG. 3, which are performed by an AUSF. Assembly of components 622 includes EAP authentication server module 623.

Data/information 624 includes a received UE authentication authenticate request message 626 from a NSWOF including a SUCI, an access network (AN) identify, a NSWO indicator and a ER indicator, a generated UE authentication Get request message 628 to be sent to a UDM including SUCI, AN identity, NSWO indicator and ER indicator, a received UE authentication Get response message 630 from the UDM including EAP-AKA dAV_SUPI, and ER_ack/ER nak.

Figure 7:
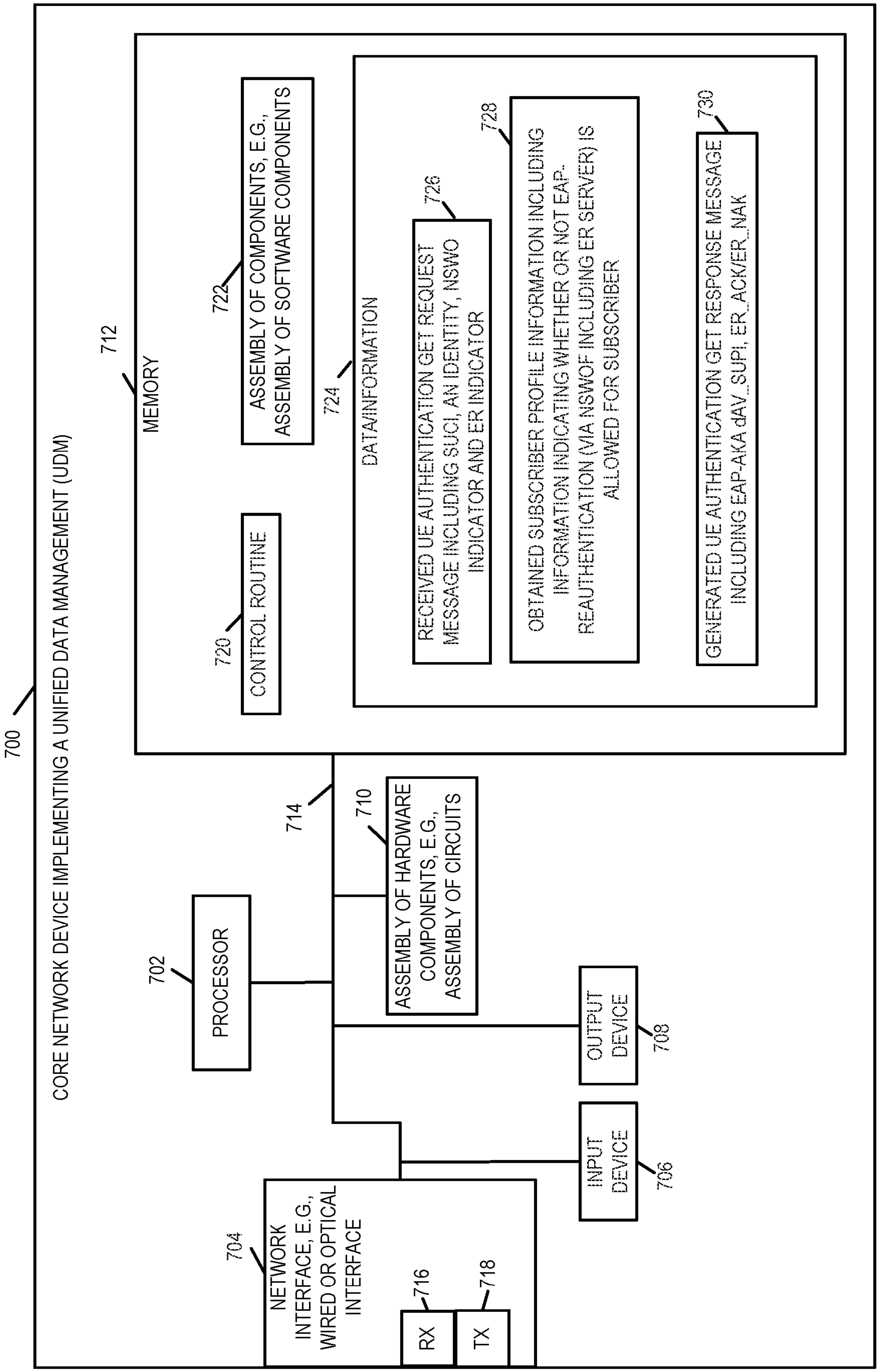
FIG. 7 is a drawing of an exemplary core network device implementing a Unified Data Management (UDM) in accordance with an exemplary embodiment.

Data/information 624 further includes a generated UE authentication authenticate response message 632 to be sent to NSWOF including EAP-Request/AKA-challenge, and ER_ack/ER nak, a received UE authentication authenticate request message 634 including EAP-response/AKA challenge, a derived DSKR 636, a received UE authenticate request message 634 including a EAP response/AKA challenge, a derived DSRK 636 and a generated UE authentication authenticate response message 638 to be sent to NSWOF including a EAP-Success indication, MSK, EMSKname, and DSRKLifetime FIG. 7 is a drawing of an exemplary core network device 700 implementing a Unified Data Management (UDM) in accordance with an exemplary embodiment. Core network device 700 implementing a Unified Data Management (UDM) is, e.g., UDM 112 of FIGS. 1-3.

Core network device 700 includes a processor 702, e.g., a CPU, a network interface 704, an input device 706, e.g., a keyboard or mouse, an output device 708, e.g., a display, an assembly of hardware components 710, e.g., an assembly of circuits, and memory 712 coupled together via a bus 714 over which the various elements may interchange data and information.

Network interface 704, e.g., a wired or optical interface, includes a receiver 716 and a transmitter 718, via which the network device 700 implementing a UDM may communicate with other devices. Network device 700 implementing a UDM receives signals including messages from other devices, e.g., core network nodes devices, e.g., an AUSF device, via receiver 716. Network device 700 implementing an UDM sends signals including messages to other devices, e.g., core network nodes devices, e.g., an AUSF device, via transmitter 718.

Memory 712 includes a control routine 720, an assembly of components 722, e.g., an assembly of software components, and data/information 724. Control routine 720 includes instructions, which when executed by processor 702 controls the core network device 700 implementing the UDM to perform basic device operational functions such as, e.g., controlling the network interface 704, accessing memory 712, storing in memory 712, etc. Assembly of components 722, e.g., an assembly of software components, includes instructions, which when executed by processor 702 control the core network device 700 implementing the UDM to implement steps of a method, e.g., steps of the methods of signaling diagrams 200 of FIG. 2 and 300 of FIG. 3, which are performed by a UDM.

Data/information 724 includes a received UE authentication Get request message 726, from an AUSF, including a SUCI, an access network (AN) identity, a NSWOF indicator, and an ER indicator, obtained subscriber profile information 728 corresponding to the SUCI including information indicating whether or not EAP-Re-Authentication (via NSWOF including ER server) is allowed for the subscriber, and a generated UE authentication Get response message 730 to be sent to the AUSF, said message including EAP-AKA dAV_SUPI, and ER_ack/ER_nak.

Figure 8:
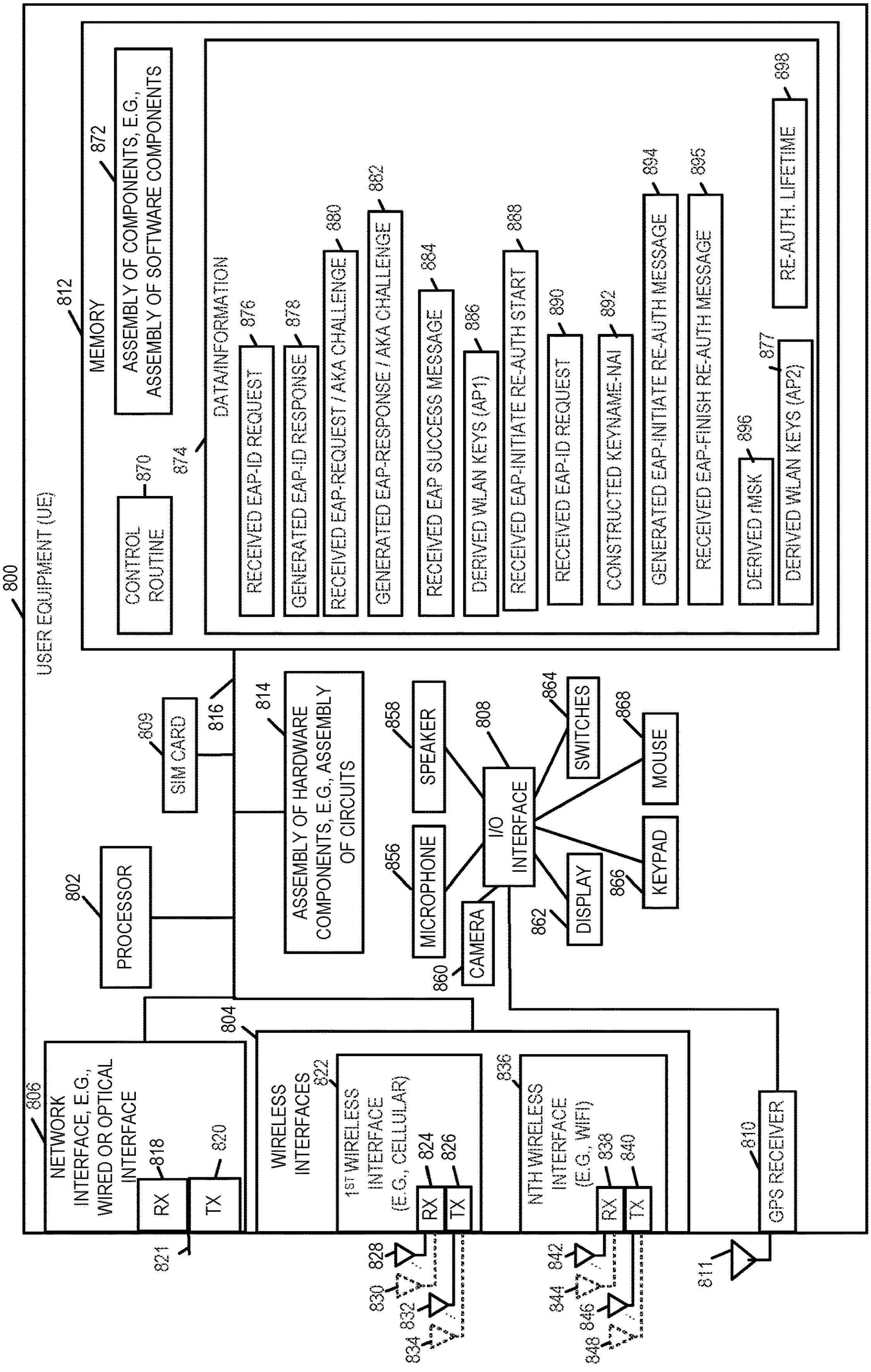
FIG. 8 is a drawing of an exemplary user equipment (UE) in accordance with an exemplary embodiment.

FIG. 8 is a drawing of an exemplary user equipment (UE) 800 in accordance with an exemplary embodiment. Exemplary UE 800 is, e.g., UE 102 of system 100 of FIGS. 1 and UE 102 of signaling diagrams 200 and 300 of FIGS. 2 and 3.

Exemplary UE 800 includes processor 802, e.g., a CPU, wireless interfaces 804, network interface 806, I/O interface 808, subscriber identity module (SIM) card 809, GPS receiver 810, memory 812, and assembly of hardware components 814, e.g., an assembly of circuits, coupled together via bus 816 over which the various elements may interchange data and information.

Wireless interfaces 804 includes a plurality of wireless interfaces (1st wireless interface 822, e.g., a cellular wireless interface, . . . . Nth wireless interface 836, e.g., a WiFi wireless interface). 1st wireless interface 822 includes wireless receiver 824 and wireless transmitter 826. Wireless receiver 824 is coupled to one or more receive antennas or receive antenna elements (828, . . . , 830) via which UE 800 receives wireless signals from cellular base stations, e.g., gNBs. Wireless transmitter 826 is coupled to one or more transmit antennas or transmit antenna elements (832, . . . , 834) via which UE 800 transmits wireless signals to cellular base stations, e.g., gNBs. In some embodiment, the same antennas or antenna elements are used for both reception and transmission to a cellular base station.

Nth wireless interface 836 includes wireless receiver 838 and wireless transmitter 840. Wireless receiver 838 is coupled to one or more receive antennas or receive antenna elements (842, . . . , 844) via which UE 800 receives wireless signals from access points, e.g., WiFi access points. Wireless transmitter 840 is coupled to one or more transmit antennas or transmit antenna elements (846, . . . , 848) via which UE 800 transmits wireless signals to access points, e.g., WiFi access points. In some embodiment, the same antennas or antenna elements are used for both reception and transmission to a WiFi access point.

Network interface 806, e.g., a wired or optical interface, includes receiver 818, transmitter 820 and connector 821. UE 800 may, and sometime does communicate with network nodes, e.g., a wireline access network device, via network interface 806, when the UE 800 is located at a site in which a wireline connection is available, and the UE is stationary and able to connect via a wireline connection.

SIM card 809 stores subscriber information corresponding to the subscriber of UE 800. GSP receiver 810 is coupled to GSP antenna 811, via which the UE 800 receives GPS signals. GPS receiver 810 processes received GPS signals to determine time, position information, e.g., latitude, longitude and altitude, and velocity information. In some embodiments, the GPS receiver 810 also performs navigation functions based on the received GPS signals and/or additional information, e.g., gyroscope and accelerometer output information, e.g., from an inertial measurement unit (IMU) on a chip included in the UE 800.

UE 800 further includes a plurality of I/O devices (microphone 856, speaker 858, camera 860, display 862, e.g., a touchscreen display, switches 864, keypad 866 and mouse 868, coupled to I/O interface 808, via which the various I/O devices may communicate with other elements within UE 800.

Memory 812 includes control routine 870, assembly of components 872 and data/information 874. Control routine 870 includes instructions, which when executed by processor 802, controls the UE 800 to perform basic device operational functions such as, e.g., controlling the wireless interfaces 804, controlling the network interface 806, controlling the various I/O devices, accessing memory 812, storing in memory 812, etc. Assembly of components 872, e.g., an assembly of software components, includes instructions, which when executed by processor 802 control the UE 800 to implement steps of a method, e.g., steps of the methods of signaling diagrams 200 of FIG. 2 and 300 of FIG. 3, which are performed by a UE device.

Data/information 874 includes a received EAP-ID request 876 from a first AP (AP1), a generated EAP-ID response 878 to be sent to AP1, a received EAP-request/AKA challenge 880, a generated EAP-response/AKA challenge 882, a received EAP success message 884, derived WLAN keys 886 for use with AP1, a received EAP-Initiate Re-Authentication start message 888 from a second AP (AP2), a received EAP-ID request message 890 from AP2, a constructed Keyname-NAI 892, a generated EAP-Initiate RE-Authentication message 894 to be sent to AP2, a received EAP-Finish Re-Authentication message 895 from AP2, a derived rMSK 896, derived WLAN keys 897 for used with AP2, an a Re-Authentication lifetime 898.

Various features of the method of the invention will now be discussed with the discussion relating largely to FIGS. 2 and 3 of the present application.

In one exemplary embodiment, when a UE (e.g., UE 102) is powered on it gets connected with network (e.g., WLAN AN1 104).

In addition to authenticating the UE, the AUSF sends additional keys to the NSWOF. These keys are stored in and preserved by the NSWOF, e.g., in a storage device such as memory in the NSWOF, for future use.

The NSWOF then acts as an ER Server in the context of EAP Re-authentication Protocol when the UE moves from one AP to another AP.

An equivalent Key is also derived by the UE.

When UE moves to a different WLAN AP from the one it was previously attached, the ER server in the NSWOF has awareness of the prior authentication of the moving UE with the NSWOF based on the stored information in the UE relating to the previously authenticated UE including the keys corresponding to the UE that were stored in the memory or another storage device in the NSWOF.

The UE when associated with new WLAN AP initiates re-authentication process.

As part of the re-authentication process the UE indicates its prior authentication with the 5GS (5G System).

The NSWOF validates UE using the prior credentials received from the AUSF and stored in the NSWOF and magic numbers, e.g., numbers used by the UE to prove its possession of authentication information, e.g., an authentication key, that is provided by the UE and communicated to the NSWOF.

EAP Re-authentication Protocol (ERP) is an EAP method-independent protocol for efficient re-authentication between the peer and an EAP re-authentication server that is used in some embodiments.

ERP allows a peer and server to mutually verify proof of possession of key material from an earlier EAP method run and to establish a security association between the peer and the authenticator.

In various embodiments, the APs act as ER authenticators, the NSWOF acts as an ERP server which is also sometimes referred to as an ER server, and the AUSF operates as an EAP server.

During EAP process in step 226 of FIG. 2 the NSWOF 108 indicates its EAP re-authentication capability by including the ER-Indicator (See message 228).

The above step is reciprocated by the AUSF 110 in step 244 acting as EAP authentication server by responding with ER-Ack/ER-Nak (See message 246).

Optionally, the AUSF 110 may further forward the ER-indicator received from NSWOF 108 to UDM (112) to facilitate per subscriber-based granularity to enable/disable this feature (See step 232 and message 234).

This capability exchange and functional fine tuning further can be refined. For example, based on operator policies, this additional capability can be turned on or off at one or more of these network functions (NSWOF, AUSF, UDM). For example, the functions can be enabled/disabled for a given group of users based on profile, domain associated with, usage status, security status and/or other factors.

During initial EAP authentication process, in step 282 of FIG. 2, the AUSF 110 in addition to sending the MSK and EAP Success to NSWOF 108, also sends to the NSWOF 108 the following: a DSRK, an EMSKname, and a DSRKLifetime (See message 283). These values may be generated in the same or similar manner to the manner discussed on pg. 11 of RFC 6696 in sec 3.2 and shown in FIG. 4 of the reference with RFC 6696 being incorporated into this application as discussed below in its entirety. This can be allowed or prevented based configuration at AUSF 110 or optionally based on ER-Ack/ER-Nak received from UDM 112 on a per subscriber basis.

The method described herein is fully backward compatible with prior release compliant devices and network functions. Legacy functions are still supported, even if any one network function does not support the features required for the present method.

An operator may enable/disable the re-authentication related features through use of an operator or management function on/at any or multiple network functions such as at the NSWOF 108, AUSF 110, and/or UDM 112.

In step 285 shown in FIG. 2, the NSWOF 108 stores and thus retain the DARK and EMSKname within the NSWOF, e.g., in memory or a storage device, and in step 286 the NSWOF 108 sends the MSK and EAP success indicator to the Authenticator (See message 287).

When a UE (e.g., UE 102) gets associated with the new AP (e.g., WLAN AN2 106), the new AP (106) indicates EAP Re-authentication capability by sending in step 304 (1) EAP-Initiate/Re-auth-Start (306) and (2) by sending in step 310 EAP-Request/Identity (312) to the UE (102).

This indicates to the UE (e.g., UE 102) that the AP (e.g., AP 106) being associated with is EAP re-authentication capable and the UE (e.g., UE 102) initiates EAP re-authentication process. This is done by exchanging the following messages, which in some embodiments are in the format as specified in RFC 6696 sec 5.3.2 and 5.3.3 i) EAP-Initiate Re-Auth (322) and ii) EAP-Finish Re-Auth (342).

In this manner during its mobility in access network the UE device may get associated with different parts of the access network, e.g., different WiFi APs and get re-authenticated. The number of such re-authentications can depend on the network operator's policy.

In some embodiments each time a UE device re-authenticates to the network (e.g., 5G core network), the key derivation process follows the procedures set forth in RFC 6696 Sec 4 and RFC 5295 which are incorporated by reference in their entirety During reauthentication process the NSWOF may, and sometimes does, use a combination of one, more or all of the following criteria based on operator policies in deciding device re-authentication: i) number of times re-authentication allowed after a full authentication and/or ii) duration for which a given device is allowed to perform reauthentication, without going through full authentication.

The methods discussed herein do not impact existing system architecture or result in incompatibility with existing systems but has several advantages including one or more of:

i) leveraging existing protocol extensions to provide the new functionality; and/or
ii) Avoiding full re-authentication during UE mobility between different APs when UE is authenticated through NSWOF, optimizes steps to be followed during UE re-authentication.

The above discussed benefits are accomplished in a backward compatible manner between devices, NSWOF and 5GS Core functions.

The methods described herein can be implemented with relatively minimal functional changes are incorporated into existing functions (UE, WLAN AN APs, NSOWF and AUSF)

Operator policies can influence/control the re-authentication feature in a fine-grained manner per subscriber, per device, per NSWOF or as system wide control, based on the number of times re-authentication is allowed after a full authentication and/or duration for which UE is allowed to perform re-authentication, without going through full authentication.

The re-authentication method described herein minimizes disruptions to user plane traffic and end user experience, reduces load on 5GS core functions such as AUSF, UDM and/or allows for the selective enabling/disabling of this feature for a given device or set of UE devices based on profile, subscription status and/or security status associated with the UE device or set of UE devices.

Service providers often have a large installed based of mobile devices, e.g., in millions, and a very large installed base of public WiFi access points, e.g., 500K in some cases, and residential WIFI access points, e.g., in the millions.

The UE devices and WiFi APs benefit from the methods described herein allowing for quick re-authentication, while UEs move around, e.g., in a relatively small footprint of Wi-Fi APs.

The methods described herein tend to minimize disruptions to user traffic and enhance user experience as compared to the case where full authentication is required with each change from one AP to another.

The re-authentication methods described herein relating to moves between APs helps minimize traffic in the service provider network and reduce load the load on service provider network functions as compared to systems where full authentication is required with each move from one AP to another. The methods described herein enable quick offload of data even in the case of UE movement between APs.

The following publicly available references are hereby incorporated by reference in their entirety and may be referenced and sometimes are referenced elsewhere in the application by using a portion of the full citation, e.g., RFC number or TS number, rather than the full reference citation:

1) 3GPP TS 23.501 V18.2.2, 3rd Generation Partnership Project; Technical Specification Group Services and System Aspects: System architecture for the 5G System (5GS): Stage 2 (Release 18), July 2023
2) 3GPP TS 33.501 V18.2.0, 3rd Generation Partnership Project; Technical Specification Group Services and System Aspects: Security architecture and procedures for 5G system (release 18), June 2023
3) IETF Network Working Group RFC 3579 RADIUS (Remote Authentication Dial In User Service) Support For Extensible Authentication Protocol (EAP), September 2003
4) IETF Network Working Group RFC 3748, Extensible Authentication Protocol (EAP), June 2004
5) IETF Network Working Group RFC 5295, Specification for the Derivation of Root Keys from an Extended Master Session Key (EMSK), August 2008
6) IETF RFC 5448, Improved Extensible Authentication Protocol Method for 3rd Generation Authentication and Key Agreement (EAP-AKA'), May 2009
7) IETF RFC 6696, EAP Extensions for EAP Re-Authentication Protocol (ERP), July 2012
8) 3GPP TS 23.502 V 18.2.0, 3rd Generation Partnership Project: Technical Specification Group Services and System Aspects: Procedures for the 5G System (5GS), June 2023

Numbered List of Exemplary Method Embodiments

Method Embodiment 1. A method for use in a communications system (100), the method comprising: operating a Non-Seamless Wireless Local Area Network (WLAN) Offload Function (NSWOF) (108) including an EAP Re-authentication (ER) server to send (226) a first User Equipment (UE) authentication request message (228) to an Authentication Server Function AUSF (110) for a first UE (102), said first UE authentication request message (228) including an ER indicator indicating support by the NSWOF sending the first UE authentication request indicating that the NSWOF (108) has ER server capabilities; and operating the NSWOF (108) to receive (248) a first UE authentication response message (246) from the AUSF (110) with an ER indicator (e.g., ER Ack/ER Nak indicating whether or not EAP reauthentication (ER) is supported for the first UE to which the UE authentication request corresponds with an ACK indicating ER support and a NAK indicating ER is not supported with an ACK thus indicating that NSWOF and/or AUSF will support ER related functionality for the first UE).

Method Embodiment 1A. The method of Method Embodiment 1, wherein the first UE authentication request message (228) is sent from the NSWOF (108) in response to the NSWOF (108) receiving (224) a message (222) from a WLAN access node (AN) (e.g., first WiFi access point) (104) to which the first UE (102) is seeking to establish a connection.

Method Embodiment 2. The method of Method Embodiment 1, further comprising: operating the NSWOF (108) to send (276) a second UE authentication request message (278) to the AUSF (110) for the first UE (said second UE authentication request message (278) including an EAP response provided by the first UE in response to a challenge provided by the AUSF); and operating the NSWOF (108) to receive (284) a second UE authentication response message (283), from the AUSF (110), in response to the second UE authentication request message (278), said second UE authentication response message indicating EAP success and including a MSK and one, more than one or all of: i) a DSRK, ii) a EMSKname and iii) a DSRKLifetime.

Method Embodiment 3. The method of Method Embodiment 1, further comprising: operating the NSWOF (108) to store (285) the DSRK, a EMSKname and a DSRKLifetime corresponding to the first UE (102) for possible re-authentication of the first UE (102); and operating the NSWOF (108) to send (287) a SWa protocol message (287) to a WLAN AN (e.g., first WiFi AP) (104) indicating successful authentication (EAP-Success) of the first UE (102) and including said MSK but not said DSRK.

Method Embodiment 4. The method of Method Embodiment 3, wherein said first UE (102) is a UE which is capable of supporting re-authentication (for WLAN ANs) through interaction with an ER server (included as part of a NSWOF), the method further comprising: operating the NSWOF (108) to receive (330) from a second WLAN access node (e.g., AN2 which may be a second WiFi AP of a second access network) (106) with which the first UE is attempting to establish a connection (e.g., a core network level connection), an initial EAP re-authentication message (322) (including information (e.g., Keyname-NAI) that was generated by the UE); and operating the NSWOF (108) to use (332) the stored DSRK corresponding to the first UE to re-authenticate the first UE.

Method Embodiment 4A. The method of Method Embodiment 4, wherein the re-authentication of the first UE (102) by the NSWOF (108) is performed without the NSWOF (108) contacting the AUSF (110) as part of the first UE re-authorization procedure.

Method Embodiment 5. The method of Method Embodiment 4, further comprising: operating the NSWOF (108) to signal (334) successful re-authentication to the second WLAN access node (106).

Method Embodiment 6. The method of Method Embodiment 1, further comprising: operating the AUSF (110) to communicate (232) to a UDM (112) information corresponding to the first UE (102) as part of a UE authentication Ger request message (234) relating to the first UE, said UE authentication Get request message (234) including an indicator indicating that re-authentication is supported by the NSWOF (108); and operating the AUSF (110) to receive (242) from the UDM (112) a UE authentication Get response message (240) with an ER indicator (ER_ack or ER_nak) indicating whether ER services are to be provided to the first UE (102).

Method Embodiment 7. The method of Method Embodiment 6, further comprising: operating the UDM (112) to determine (237) if ER services are to be provided to the first UE (102) based on one, more than one, all, or any combination of: i) a service subscription associated with the first UE, iii) a UE identifier: iii) operator policy: iv) a profile associated with the first UE, v) a domain associated with first UE, vi) network usage information associated with the first UE, vii) a security status associated with the first UE.

Method Embodiment 8. The method of Method Embodiment 7, wherein the UDM (112) controls re-authentication services provided to the first UE at one of the NSWOF (108) or AUSF (110) by sending re-authentication control information (e.g., ER indicator set to a value enabling or disabling re-authentication service for the first UE) to the NSWOF (108) and/or AUSF (110).

Numbered List of Exemplary System Embodiments

System Embodiment 1. A communications system (100), comprising: a first Wireless Local Area Network (WLAN) Access Node (AN) (e.g., first WiFi Access Point (AP)) (104): a second WLAN AN (e.g., second WiFi AP) (106); and a Non-Seamless WLAN Offload Function (NSWOF) (108) including an EAP Re-Authentication (ER) server and a first processor (502), the NSWOF (108) being coupled to the first WLAN AN (e.g., the first WiFi AP) (104) and the second WLAN (e.g., the second WiFi AP) (106), said first processor (502) being configured to operate the NSWOF (108) to: send (226) a first UE authentication request message (228) to an AUSF (110) for a first UE (102), said first UE authentication request message (228) including an ER indicator indicating support by the NSWOF sending the first UE authentication request indicating that the NSWOF has ER server capabilities; and receive (248) a first UE authentication response message (246) from the AUSF (110) with an ER indicator (e.g., ER Ack/ER Nak indicating whether or not EAP reauthentication (ER) is supported for the first UE to which the UE authentication request corresponds with an ACK indicating ER support and a NAK indicating ER is not supported with an ACK thus indicating that NSWOF and/or AUSF will support ER related functionality for the first UE).

System Embodiment 1A. The communications system (100) of System Embodiment 1, wherein the first UE authentication request message (228) is sent from the NSWOF (108) in response to the NSWOF (108) receiving (224) a message (222) from a WLAN access node (e.g., first WiFi access point) (104) to which the first UE is seeking to establish a connection.

System Embodiment 2. The communications system (100) of System Embodiment 1, wherein the first processor (502) is further configured to operate the NSWOF (108) to: send (276) a second UE authentication request message (278) to the AUSF (110) for the first UE (said second UE authentication request message (278) including an EAP response provided by the first UE in response to a challenge provided by the AUSF); and receive (284) a second UE authentication response message (283), from the AUSF (110), in response to the second UE authentication request message (278), said second UE authentication response message (283) indicating EAP success and including a MSK and one, more than one or all of: i) a DSRK, ii) a EMSK-name and iii) a DSRKLifetime.

System Embodiment 3. The communications system (100) of System Embodiment 1, wherein said NSWOF (108) further includes memory (512); and wherein said first processor (502) is further configured to operate the NSWOF (108) to: store (285), in memory 9512), the DSRK, a EMSKname and a DSRKLifetime corresponding to the first UE (102) for possible re-authentication of the first UE (102); and send (287) a SWa protocol message (287) to the first WLAN AN (e.g., first WiFi AP) (104) indicating successful authentication (EAP-Success) of the first UE (102) and including said MSK but not said DSRK.

System Embodiment 4. The communications system (100) of System Embodiment 3, wherein said first UE (102) is a UE which is capable of supporting re-authentication (for WLAN ANs) through interaction with an ER server (included as part of a NSWOF); and wherein said first processor (502) is further configured to operate the NSWOF (108) to: receive (330) from the second WLAN access node (e.g., AN2 which may be a second WiFi AP of a second access network) (106) with which the first UE is attempting to establish a connection (e.g., a core network level connection), an initial EAP re-authentication message (322) (including information (e.g., Keyname-NAI) that was generated by the UE); and use (332) the stored DSRK corresponding to the first UE to re-authenticate the first UE.

System Embodiment 4A. The communications system (100) of System Embodiment 4, wherein the re-authentication of the first UE (102) by the NSWOF (108) is performed without the NSWOF (108) contacting the AUSF (110) as part of the first UE re-authorization procedure.

System Embodiment 5. The communications system (100) of System Embodiment 4, wherein said first processor (502) is further configured to operate the NSWOF (108) to: signal (334) successful re-authentication to the second WLAN access node (106).

System Embodiment 6. The communications system (100) of System Embodiment 1, further comprising said AUSF (110), said AUSF (110) including a second processor (602) configured to operate the AUSF (110) to: communicate (232) to a UDM (112) information corresponding to the first UE (102) as part of a UE authentication Get request message (234) relating to the first UE, said UE authentication Get request message (234) including an indicator indicating that re-authentication is supported by the NSWOF (108); and receive (242) from the UDM (112) a UE authentication Get response message (240) with an ER indicator (ER_ack or ER_nak) indicating whether ER services are to be provided to the first UE (102).

System Embodiment 7. The communications system (100) of System Embodiment 6, further comprising said UDM (112), said UDM (112) including a third processor (702) configured to: determine (237) if ER services are to be provided to the first UE (102) based on one or more of: i) a service subscription associated with the first UE, iii) a UE identifier: iii) operator policy: iv) a profile associated with the first UE, v) a domain associated with first UE, vi) network usage information associated with the first UE, vii) a security status associated with the first UE.

System Embodiment 8. The communications system (100) of System Embodiment 7, wherein the UDM (112) controls re-authentication services provided to the first UE at one of the NSWOF (108) or AUSF (110) by sending re-authentication control information (e.g., ER indicator set to a value enabling or disabling re-authentication service for the first UE) to the NSWOF (108) and/or AUSF (110).

Numbered List of Exemplary Non-Transitory Computer Readable Medium Embodiments Non-Transitory Computer Readable Medium Embodiment 1. A non-transitory computer readable medium (512)

including machine executable instructions, which when executed by a processor (502) of a Non-Seamless Wireless Local Area Network (WLAN) Offload Function (NSWOF) (108 or 500) including an EAP Re-authentication (ER) server, cause the NSWOF (108 or 500) to perform the steps of: operating the NSWOF) (108 or 500) to send (226) a first User Equipment (UE) authentication request message (228) to an Authentication Server Function AUSF (110) for a first UE (102), said first UE authentication request message (228) including an ER indicator indicating support by the NSWOF sending the first UE authentication request indicating that the NSWOF (108 or 500) has ER server capabilities; and operating the NSWOF (108 or 500) to receive (248) a first UE authentication response message (246) from the AUSF (110) with an ER indicator (e.g., ER Ack/ER Nak indicating whether or not EAP reauthentication (ER) is supported .for the first UE to which the UE authentication request corresponds with an ACK indicating ER support and a NAK indicating ER is not supported with an ACK thus indicating that NSWOF and/or AUSF will support ER related functionality for the first UE).

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a Configuration Auditor and Configuration Enforcer (CACE) device, an operations support system (OSS) device, a secure shell file transfer protocol (SFTP) server, a core network node, a base station, a UE, an access point, a device including a AMF, a device including a UDM, a device including a SMF, a device including a PCF, a device including a UPF, a server, a device including a N3IWF, a device including a TNGF, a base station, e.g., a sector base station, such as gNB, ng-eNB, eNB, etc., supporting beamforming, a UE, a base station supporting massive MIMO such as a CBSD supporting massive MIMO, a network management node or device, a communications device such as a communications nodes such as e.g., a UE, an access point, a device including a AMF, a device including a UDM, a device including a SMF, a device including a PCF, a device including a UPF, a server, a device including a N3IWF, a device including a TNGF, an access point (AP), e.g., WiFi AP, a base station such as NRU gNB base station, etc., a user device such as a station (STA), e.g., WiFi STA, a user equipment (UE) device, a LTE LAA device, etc., an RLAN device, a network communications device such as router, switch, etc., administrator device, MNVO base station, e.g., a CBSD, an MNO cellular base station, e.g., an eNB or a gNB, a UE device or other device described in the present application. In some embodiments, components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method for use in a communications system, the method comprising:

operating a Non-Seamless Wireless Local Area Network (WLAN) Offload Function (NSWOF) including an Extensible Authentication Protocol (EAP) Re-authentication (ER) server to send a first User Equipment (UE) authentication request message to an Authentication Server Function (AUSF) for a first UE, said first UE authentication request message including a first ER indicator indicating that the NSWOF sending the first UE authentication request has ER server capabilities; and operating the NSWOF to receive a first UE authentication response message from the AUSF, said first UE authentication response message including a second ER indicator, said second ER indicator being an ER acknowledgment (ACK) indicating that ER is supported for the first UE or an ER negative acknowledgement (NACK) indicating that ER is not supported for the first UE.

2. The method of claim 1, wherein the first UE authentication request message is sent from the NSWOF in response to the NSWOF receiving a message from a WLAN access node (AN) to which the first UE is seeking to establish a connection.

3. The method of claim 1, further comprising:

operating the NSWOF to send a second UE authentication request message to the AUSF for the first UE; and operating the NSWOF to receive a second UE authentication response message, from the AUSF, in response to the second UE authentication request message, said second UE authentication response message indicating EAP success and including a MSK and one, more than one or all of: i) a Domain Specific Root Key (DSRK), ii) an Extended Master Session Key (EMSK) name (EMSKname) and iii) a DSRKLifetime.

4. The method of claim 3, further comprising:

operating the NSWOF to store the DSRK, the EMSKname and the DSRKLifetime corresponding to the first UE for possible re-authentication of the first UE; and operating the NSWOF to send a protocol message to a WLAN AN indicating successful authentication (EAP-Success) of the first UE and including said MSK but not said DSRK.

5. The method of claim 4, wherein said first UE is a UE which is capable of supporting re-authentication through interaction with an ER server, the method further comprising:

operating the NSWOF to receive from a second WLAN access node with which the first UE is attempting to establish a connection, an initial EAP re-authentication message; and operating the NSWOF to use the stored DSRK corresponding to the first UE to re-authenticate the first UE.

6. The method of claim 5, further comprising:

operating the NSWOF to signal successful re-authentication to the second WLAN access node.

7. The method of claim 1, further comprising:

operating the AUSF to communicate to a UDM information corresponding to the first UE as part of a UE authentication Get request message relating to the first UE, said UE authentication Get request message including an indicator indicating that re-authentication is supported by the NSWOF; and operating the AUSF to receive from the UDM a UE authentication Get response message with a third ER indicator indicating whether ER services are to be provided to the first UE.

8. The method of claim 7, further comprising:

operating the UDM to determine if ER services are to be provided to the first UE based on one, more than one or all of: i) a service subscription associated with the first UE, ii) a UE identifier; iii) operator policy, iv) a profile associated with the first UE, v) a domain associated with first UE, vi) network usage information associated with the first UE, and vii) a security status associated with the first UE.

9. The method of claim 8, wherein the UDM controls re-authentication services provided to the first UE at one of the NSWOF or AUSF by sending re-authentication control information to the NSWOF and/or AUSF.

10. The method of claim 1, wherein the first User Equipment (UE) authentication request message further includes a Non-Seamless Wireless Local Area Network (WLAN) Offload (NSWO) indicator, said NSWO indicator being in addition to said first ER indicator.

11. A communications system, comprising:

a first Wireless Local Area Network (WLAN) Access Node (AN);

a second WLAN AN; and a Non-Seamless WLAN Offload Function (NSWOF) including an Extensible Authentication Protocol (EAP) Re-Authentication (ER) server and a first processor, the NSWOF being coupled to the first WLAN AN and the second WLAN, said first processor being configured to operate the NSWOF to:

send a first UE authentication request message to an Authentication Server Function (AUSF) for a first UE, said first UE authentication request message including a first ER indicator indicating that the NSWOF sending the first UE authentication request message has ER server capabilities; and receive a first UE authentication response message from the AUSF, said first UE authentication response message including a second ER indicator, said second ER indicator being an ER acknowledgment (ACK) indicating that ER is supported for the first UE or an ER negative acknowledgement (NACK) indicating that ER is not supported for the first UE.

12. The communications system of claim 11, wherein the first UE authentication request message is sent from the NSWOF in response to the NSWOF receiving a message from a WLAN access node to which the first UE is seeking to establish a connection.

13. The communications system of claim 11, wherein the first processor is further configured to operate the NSWOF to:

send a second UE authentication request message to the AUSF for the first UE; and receive a second UE authentication response message, from the AUSF, in response to the second UE authentication request message, said second UE authentication response message indicating EAP success and including a MSK and one, more than one or all of: i) a Domain Specific Root Key (DSRK), ii) an Extended Master Session Key (EMSK) name (EMSKname) and iii) a DSRKLifetime.

14. The communications system of claim 13, wherein said NSWOF further includes memory; and wherein said first processor is further configured to operate the NSWOF to:

store, in memory, the DSRK, the EMSKname and the DSRKLifetime corresponding to the first UE for possible re-authentication of the first UE; and send a protocol message to the first WLAN AN indicating successful authentication of the first UE and including said MSK but not said DSRK.

15. The communications system of claim 14, wherein said first UE is a UE which is capable of supporting re-authentication through interaction with an ER server; and wherein said first processor is further configured to operate the NSWOF to:

receive from the second WLAN access node with which the first UE is attempting to establish a connection; and use the stored DSRK corresponding to the first UE to re-authenticate the first UE.

16. The communications system of claim 15, wherein the re-authentication of the first UE by the NSWOF is performed without the NSWOF contacting the AUSF as part of the first UE re-authorization procedure.

17. The communications system of claim 15, wherein said first processor is further configured to operate the NSWOF to:

signal successful re-authentication to the second WLAN access node.

18. The communications system of claim 11, further comprising said AUSF, said AUSF including a second processor configured to operate the AUSF to:

communicate to a UDM information corresponding to the first UE as part of a UE authentication Get request message relating to the first UE, said UE authentication Get request message including an indicator indicating that re-authentication is supported by the NSWOF; and receive from the UDM a UE authentication Get response message with a third ER indicator indicating whether ER services are to be provided to the first UE.

19. The communications system of claim 18, further comprising said UDM, said UDM including a third processor configured to:

determine if ER services are to be provided to the first UE based on one, more than one, or all of: i) a service subscription associated with the first UE, ii) a UE identifier; iii) operator policy, iv) a profile associated with the first UE, v) a domain associated with first UE, vi) network usage information associated with the first UE, vii) a security status associated with the first UE.

20. The communications system of claim 19, wherein the UDM controls re-authentication services provided to the first UE at one of the NSWOF or AUSF by sending re-authentication control information to the NSWOF and/or AUSF.

21. The communications system of claim 11, wherein the first User Equipment (UE) authentication request message further includes a Non-Seamless Wireless Local Area Network (WLAN) Offload (NSWO) indicator, said NSWO indicator being in addition to said first ER indicator.

22. A non-transitory computer readable medium including machine executable instructions, which when executed by a processor of a Non-Seamless Wireless Local Area Network (WLAN) Offload Function (NSWOF) including an Extensible Authentication Protocol (EAP) Re-authentication (ER) server, cause the NSWOF to perform the steps of: operating the NSWOF) to send a first User Equipment (UE) authentication request message to an Authentication Server Function (AUSF) for a first UE, said first UE authentication request message including a first ER indicator indicating that the NSWOF sending the first UE authentication request has ER server capabilities; and operating the NSWOF to receive a first UE authentication response message from the AUSF, said first UE authentication response message including a second ER indicator, said second ER indicator being an ER acknowledgment (ACK) indicating that ER is supported for the first UE or an ER negative acknowledgement (NACK) indicating that ER is not supported for the first UE.

* * * * *